(12) United States Patent
Morris et al.

(10) Patent No.: US 10,904,481 B1
(45) Date of Patent: Jan. 26, 2021

(54) BROADCASTING AND MANAGING CALL PARTICIPATION

(71) Applicant: Facebook, Inc., Menlo Park, CA (US)

(72) Inventors: Sarah Morris, Menlo Park, CA (US); Anne Raynor, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 16/731,279

(22) Filed: Dec. 31, 2019

(51) Int. Cl.
| | |
|---|---|
| *H04N 7/14* | (2006.01) |
| *H04L 29/06* | (2006.01) |
| *H04L 29/08* | (2006.01) |
| *H04N 7/15* | (2006.01) |
| *G06F 3/0481* | (2013.01) |
| *G06F 3/0482* | (2013.01) |

(52) U.S. Cl.
CPC .......... *H04N 7/147* (2013.01); *G06F 3/0482* (2013.01); *G06F 3/04817* (2013.01); *H04L 65/1069* (2013.01); *H04L 65/1083* (2013.01); *H04L 65/608* (2013.01); *H04L 67/306* (2013.01); *H04N 7/15* (2013.01)

(58) Field of Classification Search
CPC ............... H04N 7/14; H04N 7/15; G06F 9/54
USPC ............................ 348/14.01–14.16; 715/753
See application file for complete search history.

(56) References Cited

U.S. PATENT DOCUMENTS

| | | | |
|---|---|---|---|
| 9,628,629 B1* | 4/2017 | Kirkpatrick | ........ G06Q 10/1095 |
| 2016/0353061 A1* | 12/2016 | Leske | ..................... H04N 5/265 |
| 2017/0302466 A1* | 10/2017 | Stoner | ..................... H04L 67/42 |
| 2019/0325892 A1* | 10/2019 | Chenier | .................. H04L 67/26 |
| 2019/0342519 A1* | 11/2019 | Van Os | ................ H04N 5/2628 |

\* cited by examiner

*Primary Examiner* — Melur Ramakrishnaiah
(74) *Attorney, Agent, or Firm* — Kacvinsky Daisak Bluni PLLC

(57) ABSTRACT

The present application describes a new protocol for broadcasting and managing participation in virtual calls via a digital communication service, such as a social medial platform. The protocol allows broadcasting indications of virtual conversations between user accounts to other user accounts. In some embodiments, the indications may include invitations to join the virtual conversation. The protocol allows broadcasting and managing of virtual conversations between multiple devices via a real-time communication (RTC) channel. The protocol includes exchange messages to cooperatively establish the conversation, broadcast an indication of the conversation to at least one non-participating user, and/or manage a set of participants for the conversation.

20 Claims, 16 Drawing Sheets

400B

500

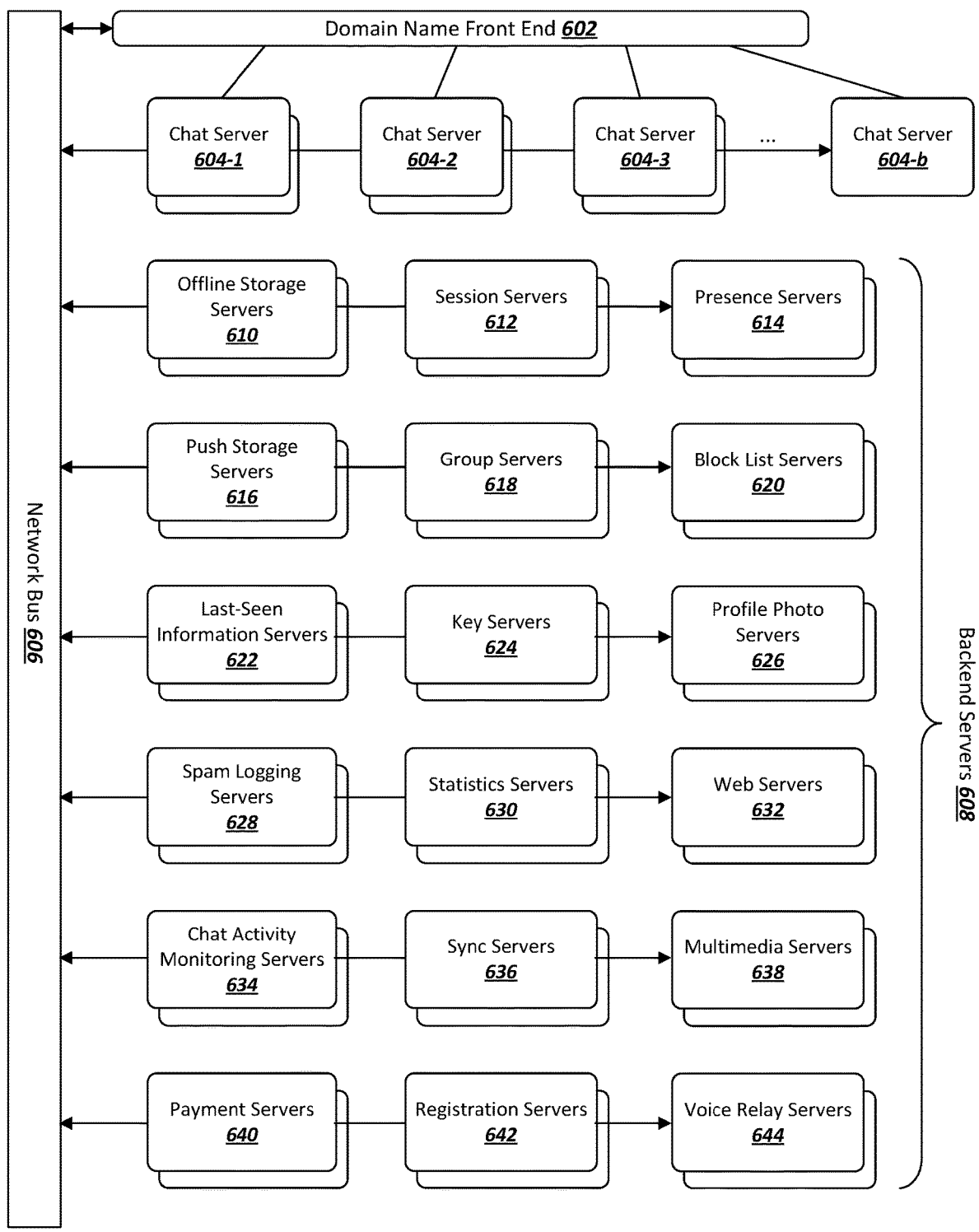

*800*

Multicarrier Device 900

US 10,904,481 B1

BROADCASTING AND MANAGING CALL PARTICIPATION

BACKGROUND

As technology becomes more readily accessible, users may choose to interact with each other, and record memories, on digital platforms. Some platforms allow users to participate in video calls and/or share records of memories, such as status posts, pictures or videos. Some platforms enable users to tag other users in posted memories, showing the presence or probable interest of the other users in the posts. Comment threads of posts may allow users to see virtual typed conversations between users of the platform.

BRIEF DESCRIPTION OF THE DRAWINGS

FIG. 6 is a block diagram depicting an example of a system for a messaging service.

DETAILED DESCRIPTION

Figure 1A:
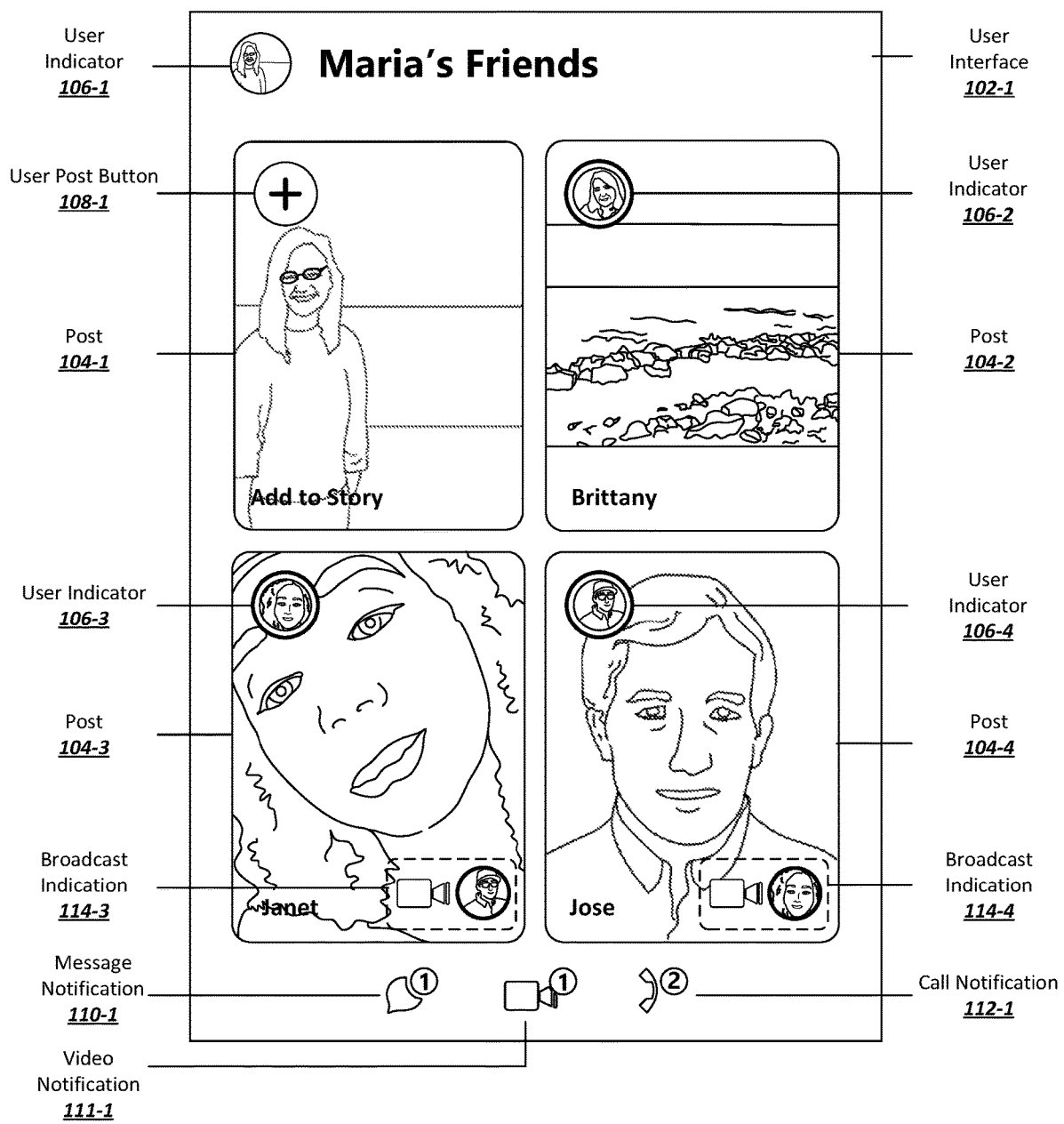
FIG. 1A depicts a first exemplary user interface including a broadcast indication of a group call.

The present application describes a new protocol for broadcasting and managing participation in virtual calls via a digital communication service, such as a social medial platform. Users of digital communication services often look to share events with other users. For example, users of social media platforms may share memories via posts to a "Story" page. Users may interact with the posts of others through viewing, commenting, and showing approval through indications such as a "like." Posts from one user account may include a tag of another user, promoting interaction of the two users through the digital service in a way that is visible to additional users. However, these interactions are typically limited to typed comments and/or static images. Current platforms lack ways for users to share their virtual conversations with others.

For example, a group of users may wish to broadcast evidence of a (potentially ongoing) video chat or virtual call to at least one other user of a digital communication service. The only way to do so may be for one to capture a static image of the call, such as a screen shot, post the image as a shared memory, and manually tag the other users involved. This process is inefficient and time consuming, and well as interruptive to the ongoing call.

Additionally, viewers may see the post and wish to join the call, but they may be unable to do so without significant effort. For example, the viewer may need a participant in the call to manually extend an invitation, such as a forwarded link to the call, via a separate communication platform. In many cases, a viewer may be unable to join a group call until the other participants have all left the call. In this example, a viewer may have to manually start a new call from a separate platform, including entering in contact information for each of the participants of the original call.

The protocol described herein allows users of a digital communication service to broadcast indications of virtual conversations (e.g., group video calls) to other (e.g., non-participating) user accounts. In some embodiments, the indications may include invitations to join the virtual conversation. The protocol allows users to initiate a broadcast of a virtual conversation, and to coordinate the conversation on multiple devices, via a real-time communication (RTC) channel. The protocol includes exchange messages to cooperatively establish the conversation, broadcast an indication of the conversation to at least one non-participating user, and/or manage a set of participants for the conversation.

Thus, the RTC video channel serves as a sort of hangout space while a user is at a real-world event such as a party. The user can capture a picture of the real-world event while engaging in video chat, and the picture is saved as an artifact in a story (other embodiments allow the user to use animated GIFs, video clips, and other elements as the artifact). The user can add an interactable element (e.g., through a graphical content selection drawer) to the image. If another user interacts with the element, that user may be brought into the video chat. If the video chat has already ended, a new video call may be started with the same original participants. This can also encourage people to attend the real-world event.

Additional aspects provide audience management features (e.g., techniques to selectively invite participants, inviting people as guests so that they do not need to log into the communications service, cross-platform or cross-service invitations), graphical artifact customization, collision detection when multiple users request to join the call, and capture technology.

The protocol may coordinate exchange messages via application programming interface (API) calls. The system is both data-type and platform agnostic. Accordingly, conversations may consist of a plurality of data types. For the sake of simplicity, virtual conversations may be referred to herein as calls, but they will be understood to include, for example, video data, audio data, text data, or any combination thereof. Broadcast indications may include an image, a graphics interchange format file (GIF), a short video, live conversation data, a sticker, or any combination thereof. Thus, users or groups of users may customize conversation sharing.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided.

As an aid to understanding, a series of examples will first be presented before detailed descriptions of the underlying implementations are described. It is noted that these examples are intended to be illustrative only and that the present invention is not limited to the embodiments shown.

RTC Broadcasting of Conversations

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-*a* may include components 122-1, 122-2, 122-3, 122-4, and 122-5. The embodiments are not limited in this context.

FIG. 1A depicts a first exemplary user interface for a digital communication service including a broadcast indication of a group call. Embodiments are not limited in this context.

A system may include a user interface associated with a user account of a digital communication service. A user interface may include a graphical user interface (GUI) For example, a digital communication service may receive a user name, password, and/or other security credentials to identify a user account. A user interface specific to the account, such as user interface 102-1, may be displayed on a client device, such as a computer, laptop, or mobile phone. An identifier, such as a universally unique identifier (UUID), may be associated with the user account. As described herein, association with a user will be understood to comprise association with a user account for a user.

A user interface may include one or more posts from an associated user account. For example, a user interface 102-1 may include a post 104-1. A post may include an image, screen shot, video, GIF, or other type of data file associated with the user account. Further, a post may include a status, a message, a story, and/or another indicator of an activity of at least one user. A user interface may receive input to update, edit, customize, or add a post to be associated with the user account. For example, a user interface 102-1 may receive input to update a post for an associated client via first client post button 108-1, including a selection of a particular image, screen shot, video, GIF, or other type of data file for display in the post.

Additionally, or alternatively, a user interface may display posts associated with at least one additional user of a digital communication service. In many embodiments, information may be displayed on a user interface according to an associated user's relationship with the user account of the user interface, such as based on a social networking graph. For example, a social networking graph may be implemented as described with respect to FIG. 5C, as described below. In exemplary user interface 102, a post 104-2 may be associated with a second user account, a post 104-3 may be associated with a third user account, and a post 104-4 may be associated with a fourth user account of a social media service.

In some embodiments, a user account may include a representation and/or identifier of an associated user, where the representation is viewable by one or more other users of the digital communication service. A user indicator 106-1 may include a representation of a user associated with a first client user interface 102-1, for example, a name and/or picture of Maria. Similarly, the user account associated with post 104-2 may be associated with user indicator 106-2, the user account of post 104-3 may be associated with user indicator 106-3, and the user account of post 104-4 may be associated with user indicator 106-4. Information is listed for the four illustrated accounts as an example only. Embodiments may include any number of accounts.

A user interface such as user interface 102-1 may include notifications associated with communications for the user account from one or more other user accounts. For example, message notification 110-1 may indicate one unread received message and/or invitation to engage in a text message conversation via the digital communication service. Similarly, video notification 111-1 may indicate an unanswered video call and/or an invitation to engage in a video call via the digital communication service, and call notification 112-1 may indicate two unanswered audio calls and/or invitations to engage in an audio call via the digital communication service. A user account may receive messages and/or calls from individual user accounts or from groups of other user accounts.

In various embodiments, a user interface 102-1 may include one or more broadcast indications of a user's engagement in a virtual conversation. The virtual conversation may include text data, video data, audio data, or a combination thereof. Posts from users who are and/or have been participants in a virtual conversation may comprise an associated broadcast indication. For example, broadcast indication 114-3 may be associated with post 104-3 and indicate the participation of the third user account, associated with Janet, for example, in a video call. Broadcast indication 114-4 may be associated with post 104-4 and indicate the participation of the fourth user account, associated with Jose, in a video call. In various embodiments, broadcast indications may comprise a sticker displayed on an associated post, or the broadcast indication may be displayed as a post for an associated user account. Broadcast indications may indicate ongoing, past, or scheduled virtual conversations between user accounts.

Broadcast indications may include indications of at least one additional participant in a virtual conversation. Participants may be represented automatically according to their participation in a virtual conversation or according to manual tagging via their own or at least one additional user accounts. For example, broadcast indication 114-3 contains information from user indicator 106-4, and broadcast indication 114-4 contains information from user indicator 106-3. The illustrated example may indicate a virtual conversation between user accounts associated with Janet and Jose. A privacy setting may restrict or allow the tagging of a participant.

Additionally, or alternatively, broadcast indications may include an indication of the type of virtual conversation conducted between users, such as a graphical artifact. For example, in broadcast indication 114-3 and in broadcast indication 114-4, images of video cameras may indicate that the virtual conversation is a video call.

Broadcast indication 114-3 and broadcast indication 114-4 are illustrated with images to communicate participation and conversation type. However, embodiments may additionally or alternatively include text, video clips, GIFs, stickers, emoticons, real-time or near real time data feed, captures from a virtual conversation, or any combination thereof. A user interface 102-1 may receive instructions to customize a graphical artifact included in a broadcast indication. For example, a user interface 102-1 may receive instructions to include a particular GIF as a graphical artifact.

In some embodiments, a broadcast indication may include an invitation for at least one user to join the virtual conversation. An invitation may correspond to a notification, such as message notification 110-1, video notification 111-1, or call notification 112-1. In some embodiments, a user interface 102-1 may display a broadcast indication in accordance with an invitation of the user account of the user interface 102-1 to join the virtual conversation. For example, broadcast indication 114-3 and/or broadcast indication 114-4's display on user interface 102-1 may indicate an invitation of the user account of user interface 102-1 to join the video call.

A user interface 102-1 may receive an acceptance of an invitation to join a virtual conversation via a notification, such as video notification 111-1. If an invitation is accepted after the end of a virtual conversation, a system may automatically initiate a new call between the associated participants, or initiate a new call between the associated participants after receiving confirmation from one or more of the associated participants. For example, selection of a notification may enable direction of the user interface 102-1 to the virtual conversation. In some embodiments, however, a broadcast indication may directly navigate to a virtual conversation. For example, a user interface may receive a selection of broadcast indication 114-3 and/or broadcast indication 114-4 and subsequently join an associated call.

Figure 1B:
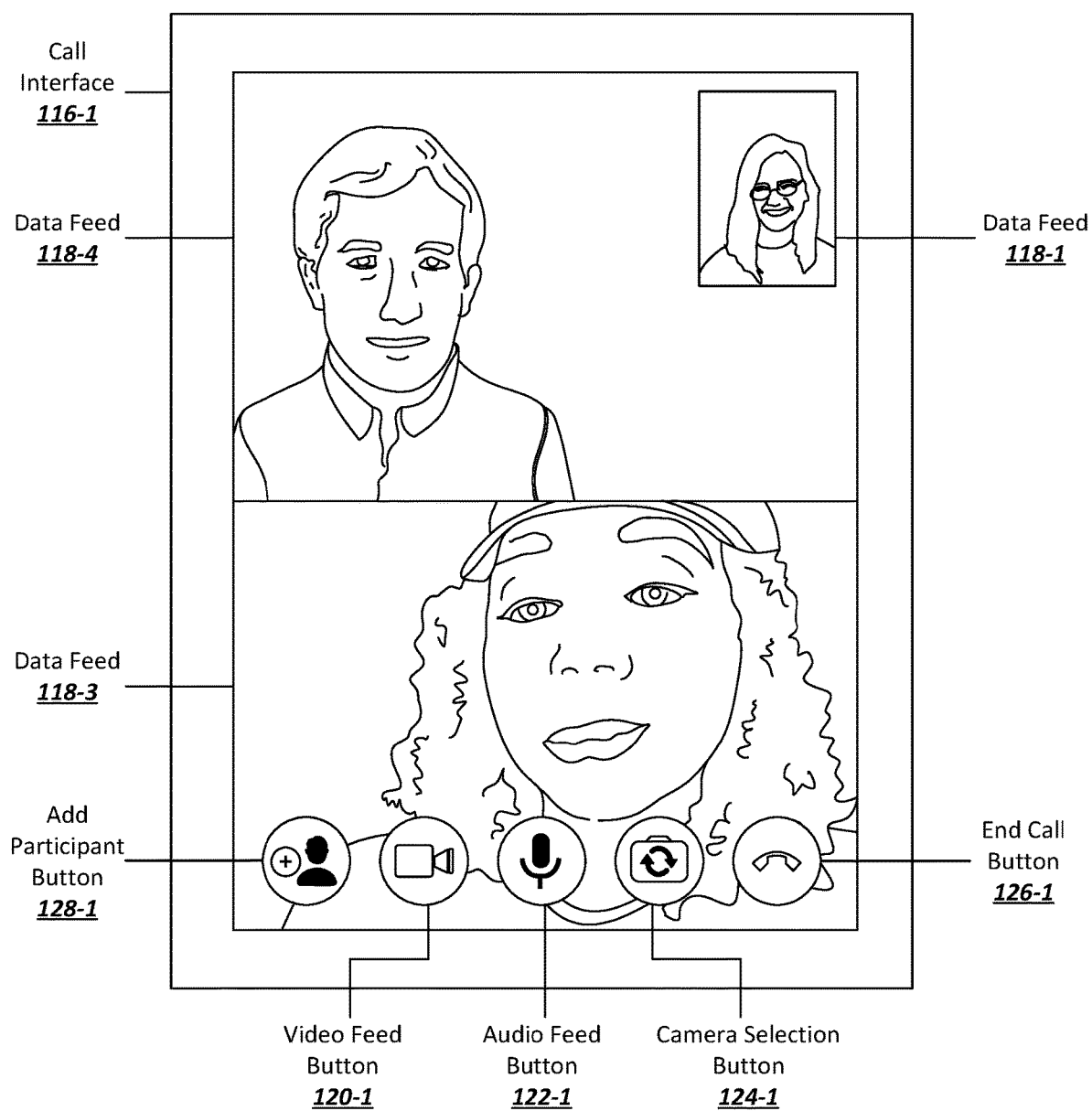
FIG. 1B depicts an exemplary video call interface.

A user interface may display a call interface based on the joining of an associated virtual conversation. FIG. 1B depicts an exemplary video call interface in association with one or more embodiments described herein. Embodiments are not limited in this context.

A call interface may include at least one data feed from another user account. The data feed may be in real time or near-real time. A data feed may include video data, audio data, or a combination thereof. Some embodiments may include additional data types such as stickers, applied effects, animations, text, a message thread, or other media type useful for conducting a virtual conversation. As illustrated, call interface 116-1 includes data feed 118-3 and data feed 118-4, each comprising at least video data.

Data feed 118-3 and data feed 118-4 include data received from the user accounts respectively associated with post 104-3 and post 104-4, as illustrated in FIG. 1A. Virtual conversations may include participants from a set of participants selected by a user, such as via a user interface, and/or of a predetermined group. A call identifier may indicate a virtual conversation between a set of participants. In some embodiments, a channel identifier may indicate a data channel used for a virtual conversation. Participants may only be able to join a virtual conversation by using a key, for example, a collision key, in association with a call identifier and/or channel identifier.

A virtual conversation may be joined based on a received selection of an invitation, such as an invitation included in a broadcast indication 114-3 or broadcast indication 114-4 in FIG. 1A. In various embodiments, a broadcast indication may include a call identifier uniquely identifying a virtual conversation. The call identifier may include a channel identifier, a link, and/or a collision key used to initiate and/or join a specific conversation.

Joining of a conversation may include a capture and sending of a data feed associated with the user account used to access the call interface 116-1. In some embodiments, a call interface 116-1 may include preview of captured visual data. For example, data feed 118-1 may be a preview of video data captured by a user device accessing a call interface 116-1 via a particular user account.

Joining of a conversation may result in a set of associated users and/or a participant list being updated to include the joining user account.

In addition to at least one data feed, a call interface 116-1 may include one or more options to receive instructions relating to the virtual conversation. For example, a video feed button 120-1 may be useful for toggling the capture of and/or sharing of video data for a virtual conversation via call interface 116-1. An audio feed button 122-1 may receive instructions to toggle capture of and/or sharing of audio data for a virtual conversation. A camera selection button 124-1 may receive instructions to select a camera on a client device used to access a call interface 116-1. For example, a front facing camera and a rear facing camera may be toggled. Additional controls that may be included embodiments include call settings, text-based conversations, or application of media effects in association with a virtual conversation.

A call interface 116-1 may include an option to receive instruction to leave and/or end a virtual conversation. For example, a call interface 116-1 may include an end call button 126-1. A system may redirect a user from a call interface 116-1 to another interface, such as user interface 102-1, upon receiving an instruction to leave a virtual conversation.

In many embodiments, a call interface 116-1 may include an option to broadcast a record of the call, such as a broadcast indication as described with respect to FIG. 1A. A broadcast indication may be broadcast automatically based on a user account joining a virtual conversation. Specifically, a system may understand an acceptance of an invitation to join a virtual conversation to indicate a user's approval of the sharing of a broadcast indication. Additionally, or alternatively, sharing of a broadcast indication may be restricted and/or managed according to input received via a call interface 116-1 or a user setting for the digital communication service. In some embodiments, a call interface 116-1 may receive instructions for managing a broadcast indication via an add participant button 128-1.

Figure 1C:
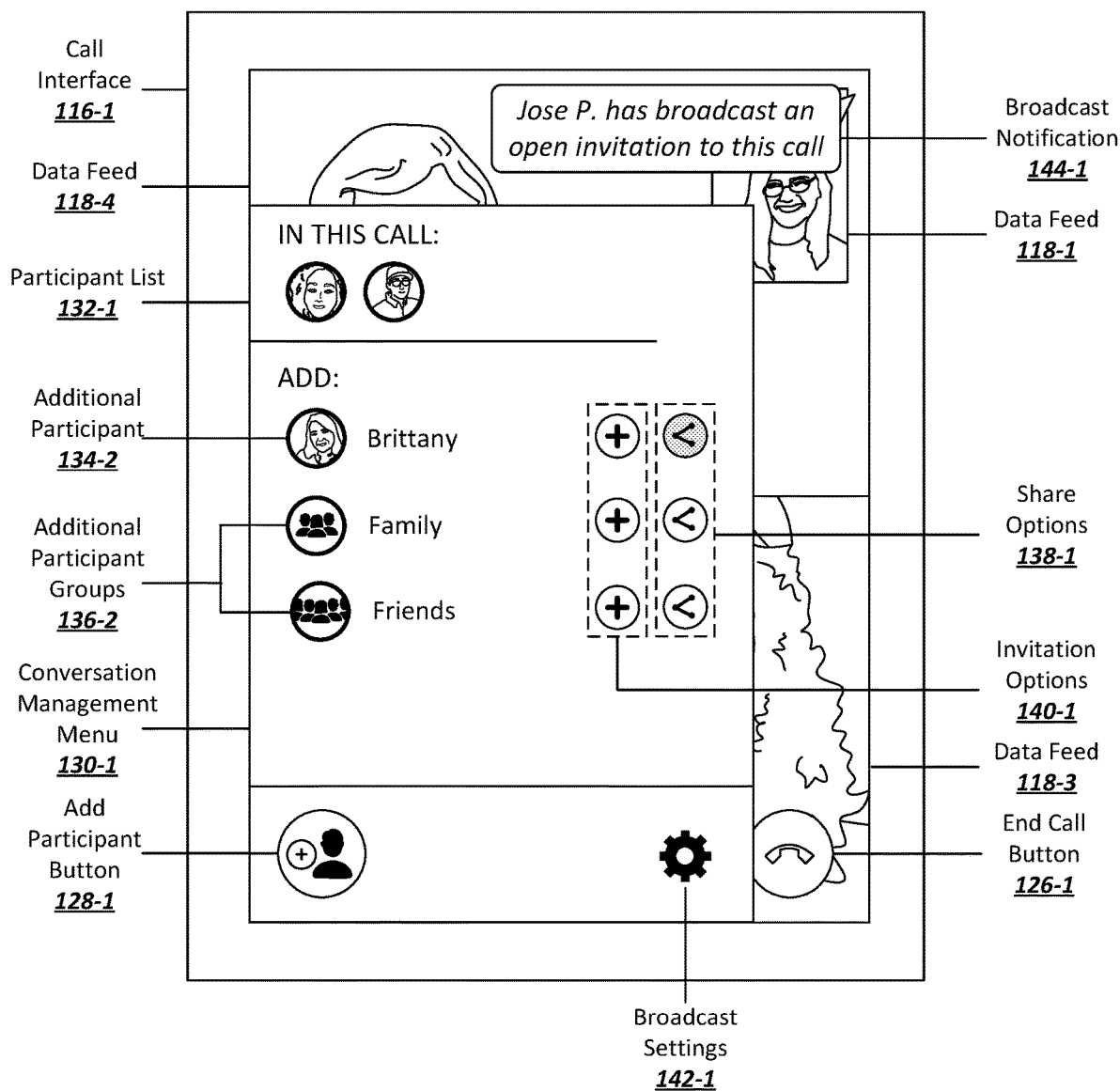
FIG. 1C depicts an exemplary user interface for receiving broadcast instructions for a group call.

FIG. 1C depicts an exemplary user interface for receiving broadcast instructions for a group call. An add participant button 128-1 may enable a system to receive one or more instructions to share a broadcast indication associated with virtual conversation with one or more additional user accounts. For example, an option such as an add participant button may enable a system to offer conversation management options via a menu. Additionally, or alternatively, a system may receive broadcast instructions for a virtual conversation at the initiation of the conversation, via a broadcast setting, or via another option. Embodiments are not limited in this context.

A conversation management menu 130-1 may include one or more options for managing the broadcasting or sharing of a virtual conversation. A conversation management menu 130-1 may include a participant list 132-1, which may provide indication of at least one user account associated with the virtual conversation. Specifically, a participant list 132-1 may include indication of some or all accounts participating in and/or invited to participate in a virtual conversation.

Additionally, or alternatively, a conversation management menu 130-1 may include one or more options to include other users in a virtual conversation. A single user account, such as additional participant 134-2, or multiple user accounts may be selected for conversation sharing. A selection of a user to be invited to the group conversation may be based on a phone number, an email address, a user name, an internet protocol address, a device identifier, an account identifier, and/or another user identifier. Some embodiments may enable a virtual conversation to be shared with groups of users, such as additional participant groups 136-2. Groups of users may be determined manually, for example, by a user via a user interface, or automatically, for example, based on proximity and/or relationship to a user account in a social networking graph.

Conversation sharing may extend across platforms. For example, a participant in a virtual conversation may extend an invitation to an additional participant who is not a user of and/or who is not logged into the digital communications service. In some embodiments, at least one participant may be a user of a supported service, for example, an approved alternative virtual conversation service.

A system may receive instructions to broadcast an indication of a virtual conversation to one or more additional users according to one or more selected share options 138-1 and/or invitation options 140-1. Share options 138-1 and/or invitation options 140-1 may be determined individually for potential additional participants and/or groups of additional participants.

A broadcast indication may or may not include an invitation to a virtual conversation according to share options 138-1 and/or invitation options 140-1. In FIG. 1C, selection of a share option for Brittany may result in the sending of a broadcast indication to a social media user interface associated with Brittany. However, lack of selection of an invitation option may result in the broadcast indication not including an invitation and/or identifier for the virtual conversation. In this way, the existence of a conversation may be shared with friends of a participant without the extension of an open invitation to unwanted users.

A broadcast indication that does not include an invitation to a virtual conversation may not direct to the conversation if selected by a user via a user interface, such as user interface 102-1. In some embodiments, a request for a user account to join a virtual conversation may be sent to one or more participating accounts of the conversation based on the user account's selection of a broadcast indication without an invitation to the call.

Broadcast settings 142-1 may determine group definitions, privacy settings, default and/or custom share options 138-1 and invitation options 140-1 in association with a user account.

In some embodiments, only an initiating user account of a virtual conversation may manage participants. In some embodiments, at least one additional participant of a conversation may manage participants. For example, a user account used to access user interface 102-1 may manage participants of a video conversation including other participants after joining the conversation via a broadcast indication. A default setting may establish management privileges for participants. Alternatively, or additionally, a setting established by a user account or another method useful for efficiently determining privileges may establish management privileges.

Various embodiments may coordinate management of participants across multiple user accounts. For example, an invitation to another user account to join a virtual conversation may require approval from some or all current participants of the conversation.

Determination by one or more user accounts that a broadcast indication should be shared may result in a broadcast indication being displayed in accordance with one or more of the user accounts. For example, determination by the user account of Janet that an indication of a video call with the user account of Jose may result in a broadcast indication being displayed with respect a post 104-3 of Janet's account or a both post 104-3 and post 104-4, associated with the account of Jose Inclusion of an invitation in a broadcast indication may similarly be applied to broadcast indications displayed with respect to one or more user accounts.

Determination of which accounts may display a broadcast notification may be determined according to pre-configuration and/or one or more privacy settings for at least one of the participants. In many embodiments, more conservative privacy settings of one user will take precedence over less conservative privacy settings of another user. For example, a broadcast indication may not be displayed with Janet's post 104-3, or the broadcast indication 114-3 may not include an indication of Jose's participation, if privacy settings of Jose's user account indicate a limit of distribution of that information.

In many embodiments, a broadcast notification 144-1 may communicate the broadcast of an indication of a virtual conversation by a participant to at least one other participant of the conversation. For example, participating user Jose's broadcast of open invitation to the call may be communicated to other participating users Maria and Janet via broadcast notifications. Accordingly, participants of virtual conversations may be informed as to which other user accounts may access the conversation.

A broadcast indication shared by a user account participating in a virtual conversation may be viewed by at least one additional user account. In many embodiments, at least one viewer of a broadcast indication may not be a participant in an associated virtual conversation. For example, the sharing of a broadcast indication with Brittany via share options 138-1 may result in at least one broadcast indication being displayed on a user interface accessed by a user account for Brittany on the digital communication platform.

Figure 1D:
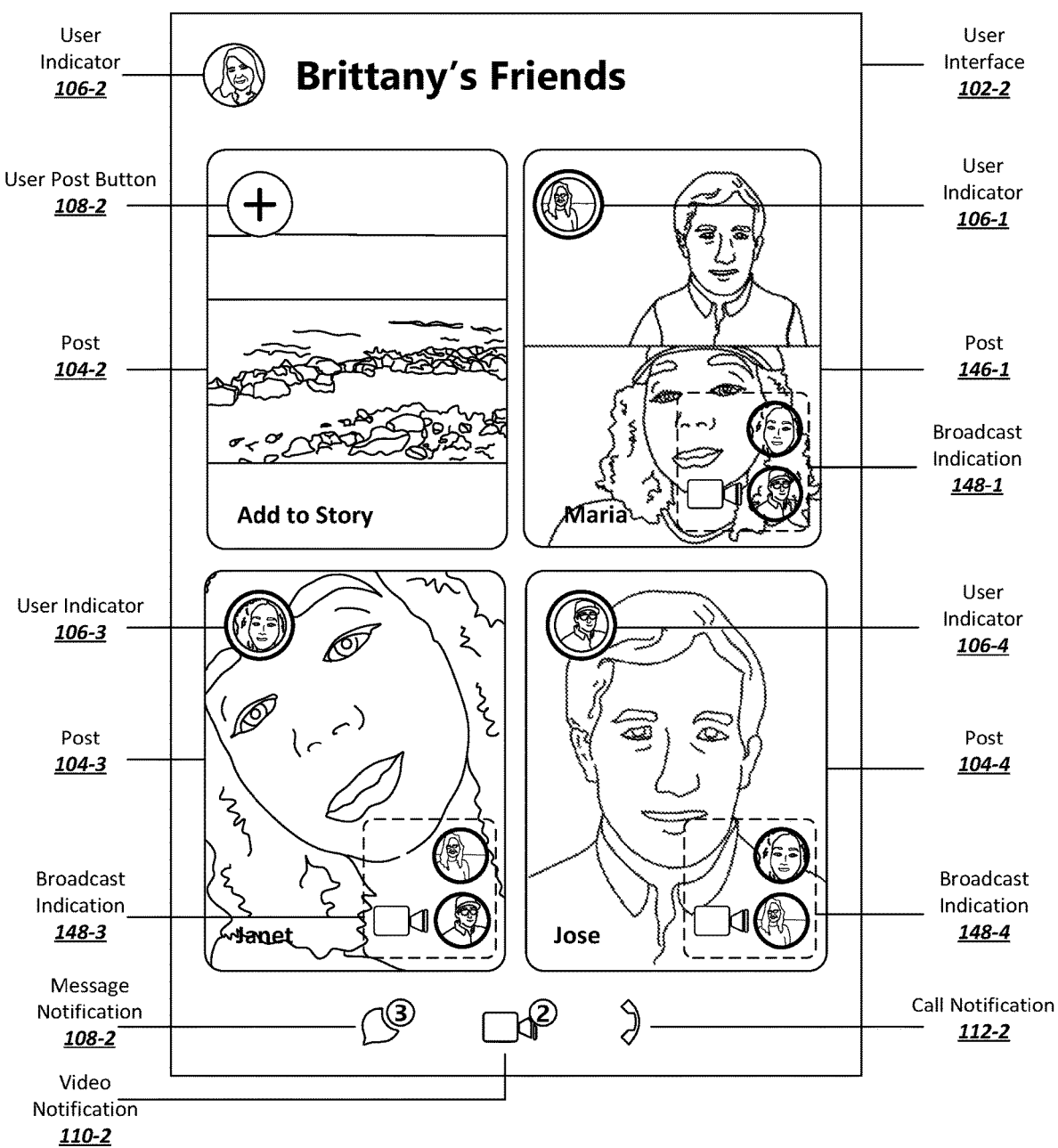
FIG. 1D depicts a second exemplary user interface including a broadcast indication of a group call.

FIG. 1D depicts a second exemplary user interface including a broadcast indication of a group call. FIG. 1D may correspond to the exemplary use case illustrated by FIG. 1C. Embodiments are not limited in this context.

A user account receiving a broadcast indication of a virtual conversation may access a user interface such as user interface 102-2. A user interface may have various components the same or similar to user interface 102-1. For example, a user interface 102-2 may include a user indicator 106-2 similar to user indicator 106-1 but associated with a different respective user. User post button 108-2 may receive input for editing, adding, and/or updating a user post for the user account associated with user interface 102-2. Notifications may function similarly to those described with respect to FIG. 1A but be specific to the account, including message notification 110-2, video notification 111-2, and call notification 112-2.

A user interface 102-2 may display one or more broadcast indications associated with call interface 116-1 in association with share options 138-1. As the user account of Maria had joined the call between user accounts of Janet and Jose, broadcast indications displayed subsequently on user interface 102-2 may reflect the updated participant list. For example, broadcast indication 148-1 in association with a user account for Maria may indicate participation of Maria's user account in a virtual conversation with user accounts of Janet and Jose. Broadcast indication 148-3 in association with Janet's user account may indicate participation in a video call with Maria and Jose's respective user accounts, and broadcast indication 148-4 in association with Jose's user account may indicate participation in a video call with Maria and Janet In some embodiments, a broadcast indication may comprise a post in association with a user account. For example, a post 104-1 may be replaced and/or updated with post 146-1 in association with a user account for Maria upon the joining of the user account with a video call. Post 146-1 may include an image, a captured frame from the virtual conversation, a graphics interchange format file (GIF), a short video, live conversation data, a sticker, or any combination thereof in a custom graphical artifact. In various embodiments, content of a graphical artifact in a post 146-1 may be captured from a virtual conversation, such as via a screen shot.

As with broadcast notifications, the content of a post 146-1 may be pre-determined or determined according to input received via a user interface. Users participating in the conversation may be tagged in the post automatically or according to input received via a user interface.

A post 146-1 including a broadcast indication may be selected to view more information about the associated conversation, such as a participant list in accordance with privacy settings of the participants. A post 146-1 may include an invitation to join the conversation. For example, a post 146-1 may include an invitation to a specific user or group of users based on input received from a participant. Selection of a post including an invitation to a virtual conversation may enable a system to directly navigate to the conversation. Selection of a post not including an invitation to a virtual conversation may enable a system to send one or more requests to join the conversation to at least one participating user account. Approval of the request, such as approval received via a user interface, may result in the requesting user to be added to the virtual conversation. Accordingly, an associated participant list and/or broadcast indications may be updated.

Various embodiments may broadcast at least one indication of participation in a historic virtual conversation. For example, a recipient of an invitation may be unable to join the conversation until all active participants have left the conversation. A participant list may be associated with a call identifier and/or broadcast indication. Accordingly, selection of an invitation to a virtual conversation without remaining participants may result in an automated re-initiation of the conversation. For example, all participants in a participant list may be called back. Participants may thus return to historic conversations without a need to identify and enter contact information for individual other participants, improving convenience of digital communication services.

Exemplary System Configuration and Data Structures

Figure 2A:
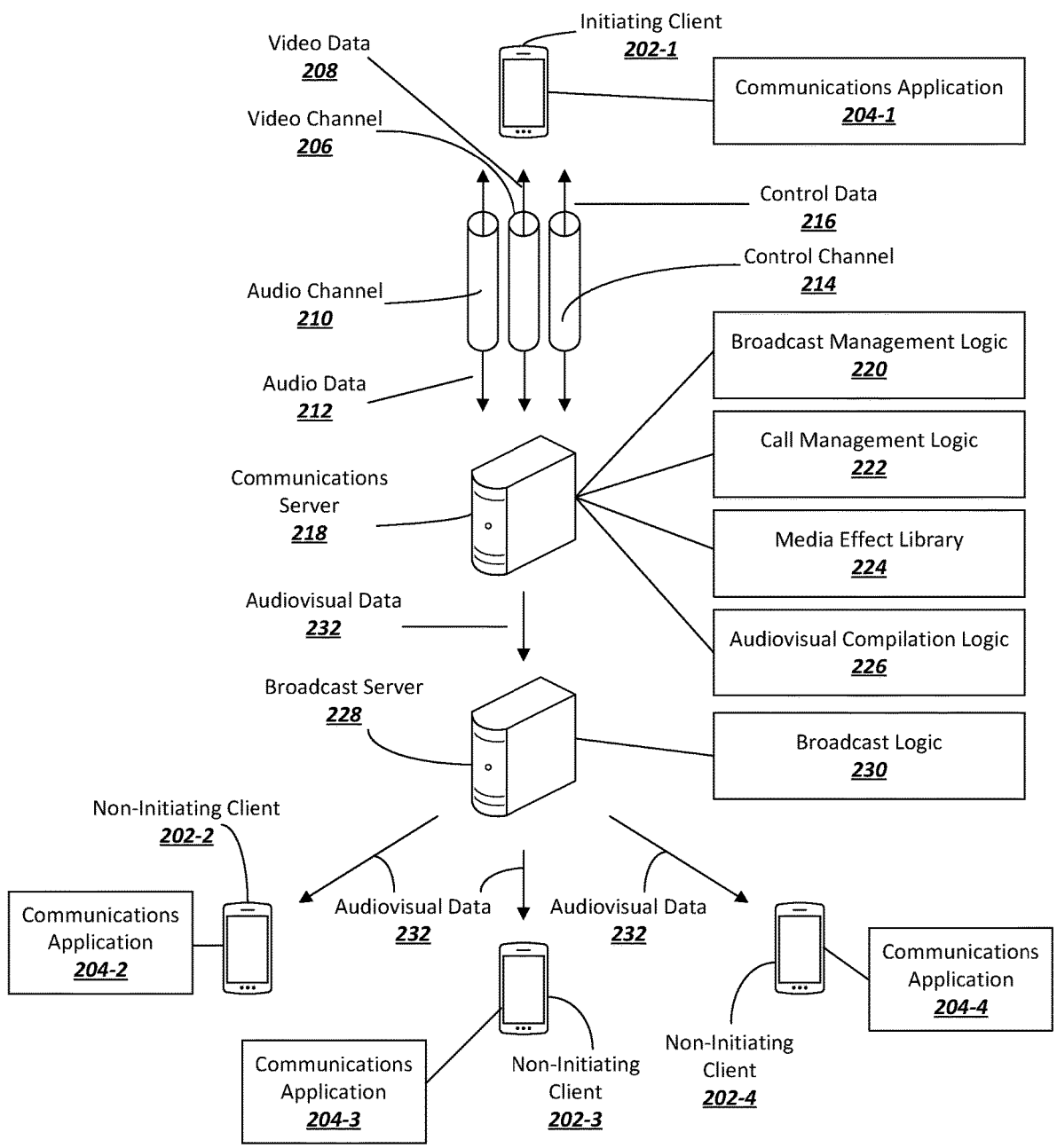
FIG. 2A is a block diagram depicting an exemplary client device/server environment suitable for use with various embodiments.
Figure 2B:
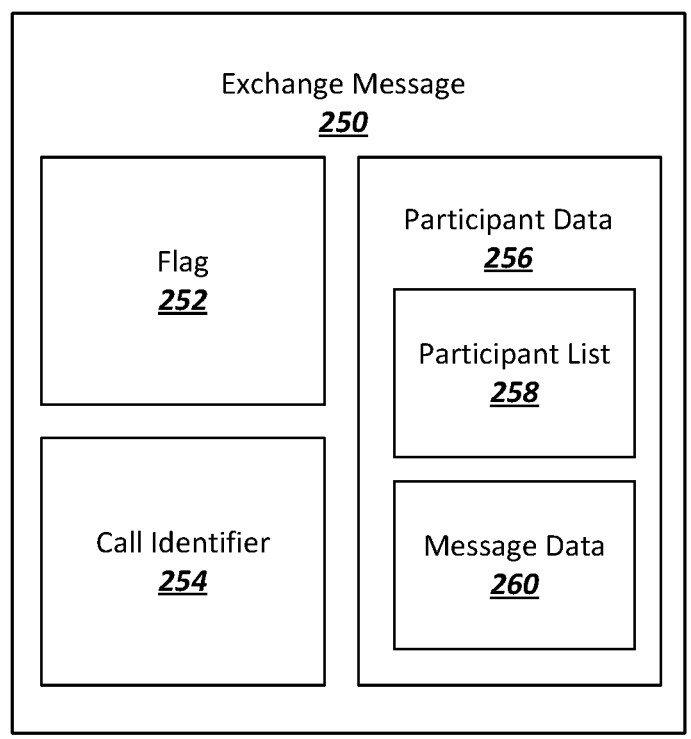
FIG. 2B depicts an exemplary data structure for an exchange message.

FIG. 2B depicts an exemplary system for broadcasting and managing participation in a group virtual conversation. Embodiments are not limited in this context.

The system may enable a virtual conversation, which may be (e.g.) a one-to-one, one-to-many, or group communication. In many embodiments, a virtual conversation may include a video communication. Alternatively, or additionally, the system may facilitate the broadcasting of at least one indication of the virtual conversation. Embodiments may further include management of participation in a virtual conversation based on input received related to a broadcast indication. An example will be described below with reference to broadcasting an indication of and managing participation for a video call; however, it is understood that the present application is not limited to this example.

An initiating client device 202-1 may be a device associated with a first participant in a communication. The initiating client device 202-1 may be, for example a mobile device (although the present invention is not limited to application by mobile devices) executing a communications application 404-1 for participating in a coordinated activity, such as a video communication for a video-based conference call, with one or more other participants. The initiating client device 202-1 may be a device that initiates a coordinated effect to be applied at or by one or more non-initiating client devices 202-2, 202-3, 204-4, etc.

The communications application 204-1 may cause information associated with the video communication to be transmitted to one or more servers that facilitate the communication. For example, the information may include video data 208 containing video frames associated with the communication, audio data 212 containing sound information to be synchronized with the graphical frames, and control data 216. The control data 216 may include various instructions, identifiers, metadata, etc. used to apply a coordinated effect that are associated with (e.g., synchronized to) the video data 208 and the audio data 212.

In some embodiments, the video data 208 and audio data 212 may be captured by components of one or more client devices, such as initiating client device 202-1 or non-initiating client devices 202-2, 202-3, 204-4, etc. A communications application 204-1 may include, in some embodiments, a user interface for a digital communications service, such as a social media platform. A communications application 204-1 may display, in various embodiments, at least one broadcast indication associated with the video communication.

Each type of data may be transmitted in an associated channel. For example, the communications application 204-1, or another component of the initiating client device 202-1, may open a video channel 206, an audio channel 210, and a control channel 214 with the communications server 218. The video channel 206 may carry only video data 208 in a video format. Thus, the communications server 218 may treat any data received on the video channel 206 as data in a video format and may process the data appropriately. Similarly, the audio channel 210 may carry only audio data 212 in an audio format.

It is understood that the present invention is not limited to transmitting video data 208 and audio data 212 on video channels 206 and audio channels 210, respectively. For example, graphical data may be shared in a data channel in the case where the virtual conversation is a message thread. In an example involving a multiplayer game, game data may be shared in a data channel dedicated to carrying information about the state of the game. For a group audio call, the channels may include an audio channel 210 but no video channel 206. In each case, the control channel 214 may be a real-time or near real-time channel that is separate and distinct from the data channels.

The control channel 214 may transmit generic data that is not necessarily in a predetermined format or may transmit control instructions in a specified control format. For example, the control channel 214 may carry an instruction to adjust access to the video data 208 and/or audio data 212 or may carry an instruction to send a broadcast indication with at least one other client device. The control channel 214 may be, for example, a Web Real Time Communications (WebRTC) channel.

The video channel 206, audio channel 210, and control channel may carry information in both directions. Thus, for example, the video channel 206 and audio channel 210 may carry data for display/playback on the initiating client device 202-1 (e.g., data relating to the video streams of one or more non-initiating client devices 202-2, 2-3, 202-4). The control channel 214 may carry instructions from the communications server 218 for managing access to a virtual conversation, and/or other instructions.

The communications server 218 may be configured to coordinate the sharing of a broadcast indication of a virtual conversation between one or more initiating client devices 202-1 and one or more non-initiating client devices 202-2, 202-3, 202-4, etc., by applying broadcast management logic 220. Additionally, or alternatively, the communications server 218 may be configured to manage participation in a virtual conversation between one or more initiating client devices 202-1 and one or more non-initiating client devices 202-2, 202-3, 202-4, etc., by applying call management logic 222. The communications server 218 may also store a media effect library 224, which includes data relating to a number of broadcast indications. For example, the broadcast indication media may include graphical artifacts such as images, GIFs, etc. The broadcast indication media may be identified by an identifier, and the media effect library may optionally mirror a media effect library stored locally at the client devices 202. Alternatively, or additionally, the library stored at the communications server 218 (or split between multiple communications servers 218) may be partially cached at the local client devices 202. In some cases, the local client devices may include thumbnail versions of the coordinated effects, allowing the effects to be selected in the communications application 204, but preserving storage on the client devices 202 by not including implementation details of the coordinated effects. Upon application of the coordinated effect, the respective client device 202 may request the implementation details from the communications server 218.

The communications server 218 may further include audiovisual compilation logic 226 for combining the video data 208, the audio data 212, and any broadcast indications. The audiovisual compilation logic 226 may include logic for synchronizing the audio data 212 with the video data 208, and further for applying broadcast indications with the combined audio/video data (or with the audio data 212 or video data 208 individually). For example, the audiovisual compilation logic 226 may coordinate the combination and application of a broadcast indication including video data from a virtual conversation.

Once combined, the resultant audiovisual data 232 may optionally be transmitted from the communications server 218 to a broadcast server 228. The broadcast server 228 may include broadcast logic 230 that identifies one or more recipients, such as non-initiating client devices 202-2, 202-3, 202-4, associated with the video communication. The broadcast server 228 may transmit the audiovisual data 232, which includes the audio data 212, the video data 208, and/or at least one broadcast indication, to each of the recipients.

In some cases, the audiovisual data 232 may be broadcast to all recipients, but messages related to broadcast indications and/or management of call participation may be transmitted on respective control channels 214 to non-initiating clients 202-i. In some embodiments, the control data 216 may also be provided to some or all non-initiating clients 202-i.

For instance, in the example shown in FIG. 1A, the video call may be initiated by Janet's device and may require coordination with Jose's device in order to extend an broadcast indication including an invitation to Maria's device. For example, the broadcast indication may only be sent after approval from both Janet and Jose, and/or the broadcast indication may include a capture of data from Jose's device. Although the video data may continue to be broadcast by the broadcast server 228 as broadcast indication is coordinated, the control data provided to and from each of the devices may vary. For example, Janet's device may transmit an initiation instruction on the control channel 214, which may be relayed to Jack's device. Jack's device may transmit acknowledgements, data, etc. to the communications server 218 on its own respective control channel 214 (not shown). Subsequently, a broadcast indication may be sent from communications server 218 to Maria's device.

Each device may transmit/receive control data 216 to/from the communications server 218 to allow one or more notifications of broadcast indications to be displayed on their respective user interfaces, such as broadcast notification 144-1. A broadcast notification may, in embodiments, be applied to respective audio data 212 and/or video data 208.

Alternatively, notifications may be applied locally by respective client devices. Audiovisual data 232 modified with a broadcast notification may be sent by the broadcast server 228 to each participant in the virtual conversation.

Although FIG. 2A depicts a particular example involving coordination between a client and a server, it is noted that the present invention is not limited to such embodiments. In other examples, multiple servers may be used, or no servers may be used. For instance, in a peer-to-peer implementation, the initiating client device 202-1 may communicate directly with the non-initiating client devices 202-2, 202-3, 202-4, without the aid of the intervening communications server 218 and/or broadcast server 228. In such an embodiment, the respective clients may implement the broadcast management logic 220, call management logic 222, the media effect library 224, and/or the audiovisual compilation logic 226. In some embodiments, the clients 202-i may communicate in a peer-to-peer manner, but may be supported by one or more servers (e.g., a server storing the media effect library 224).

FIG. 2B depicts an exemplary data structure for an exchange message. Embodiments are not limited in this context.

An exchange message 250 may be sent by a client device to a communications server and/or another client device to broadcast an indication of a virtual conversation and/or to coordinate a virtual conversation. The exchange message 250 may be received by the communications server over an RTC channel.

Figure 3A:
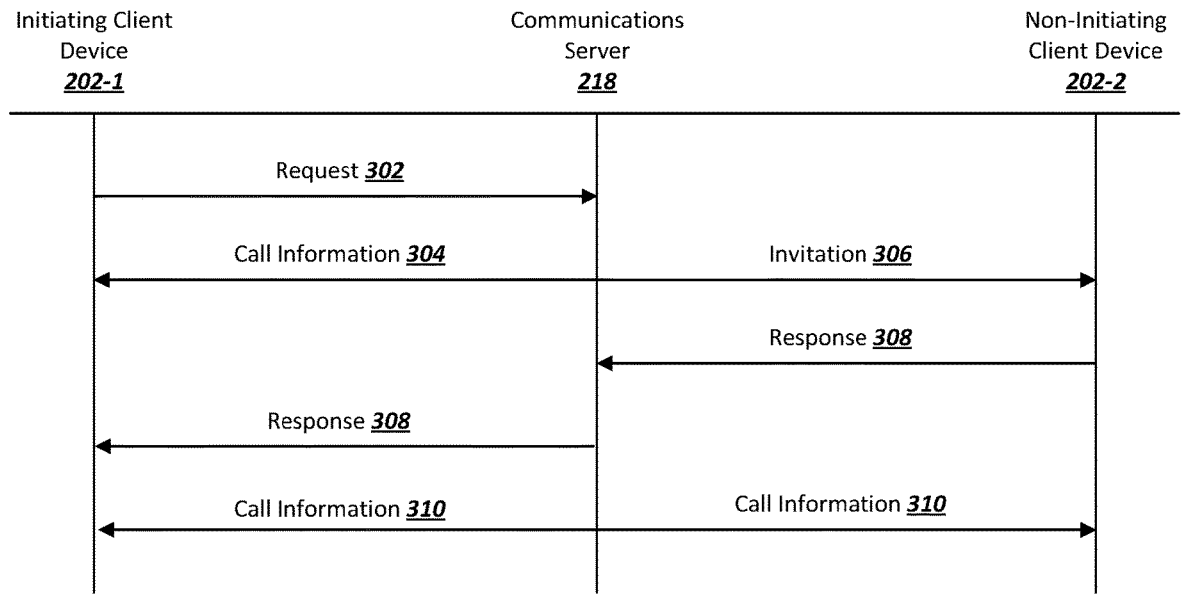
FIG. 3A-B are data flow diagrams depicting exemplary information exchange in a client device/server environment.
Figure 3B:
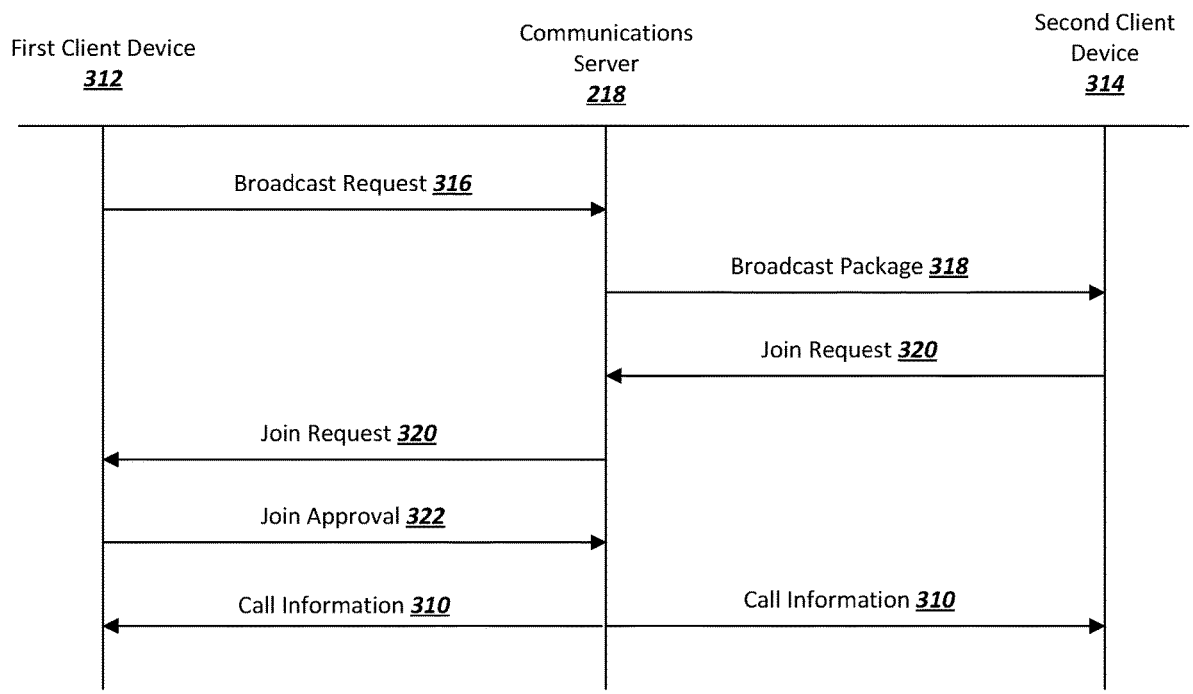

The exchange message 250 may include a flag 252 or other identifier to allow recognition of the exchange message 250 as pertaining to the broadcast and/or management of a virtual conversation. A flag 252 may identify an exchange message 250 as including a broadcast indication, a call initiation request, a call identifying message, an invitation message, an invitation acceptance, a broadcast request, a join request, a join approval, a broadcast notification, and/or other message. FIG. 3A-B explains various exemplary messages in greater detail. In many embodiments, an exchange message 250 may include a flag 252 in header data. The flag 252 may enable a communications server 218, broadcast server 228, and/or client device receiving the exchange message 250 to readily identify and process the message.

An exchange message 250 may contain a call identifier 254. A call identifier 254 may uniquely identify a virtual conversation between a set of participants. In some embodiments, a call identifier 254 may include a channel identifier, a link, and/or a collision key used to initiate and/or join a specific conversation. A channel identifier may identify a data channel used for a virtual conversation.

In some embodiments, a call identifier may include a channel identifier and/or link accessible only when certain security measures are met. For example, a participant may only be able to access and/or use the data channel and/or link of the exchange message 250 while logged in or after logging into a digital communication service. In some embodiments, a call identifier may include a channel identifier and/or link open to participants not logged into a particular digital communication service. For example, possession of the call identifier and/or link by a participant may indicate that the participant was invited to join the call as part of a participant list 258.

Participants may only be able to join a virtual conversation by using a key, for example, a collision key, in association with a call identifier and/or channel identifier. The call identifier 254 may thus enable participants to join the correct virtual conversation.

The exchange message 250 may include participant data 256. Participant data 256 may include data relating the exchange message 250 to one or more user accounts. In many embodiments, participant data 256 may include a participant list 258 and/or message data 260.

A participant list 258 may include information relating to at least one user's participation in a virtual conversation. A participant list 258 may include at least one or more user identifiers, for example, user account UUIDs, phone numbers, email addresses, or internet protocol addresses. The participant list 258 may include intended recipient user accounts and/or user devices for the exchange message, such as with an invitation to join a virtual conversation. In some embodiments, the participant list 258 may include an identifier of a sending user account and/or user device. Additionally, or alternatively, a participant list 258 may include user accounts associated with a virtual conversation, such as user accounts participating in the virtual conversation. For example, if an exchange message 250 comprises a broadcast indication, a participant list 258 indicating the user account sending the invitation may enable a notification to be displayed accordingly on a user interface for the recipient. In a further example involving a broadcast indication, a participant list 258 indicating participants of a video call may enable a system to display a broadcast indication in accordance with user posts of the participants. For example, broadcast indications 148-1, 148-3, and 148-4 may be respectively displayed with posts from users Maria, Janet, and Jose P on a user interface 102-2 for Brittany.

A participant list 258 may contain entries including different user identifier types. For example, a participant list 258 may include a user account UUID for a first additional participant and a phone number for a second additional participant. Accordingly, embodiments may support inclusion of users across multiple platforms and/or services.

Additionally, or alternatively, participant data 256 may include message data 260. Message data 260 may include data relating to at least one user account that may be useful for processing an exchange message. In many embodiments, message data 260 may include data associated with each of a list of participants in a participant list 258. Message data 260 may include one or more user indicators or message content to be displayed in accordance with the participants. For example, if an exchange message 250 includes a broadcast indication in the context of the example of FIG. 1D, message data 260 may include user indicators 106-1, 106-3, and 106-4 in association with respective identifiers for participants Maria, Janet, and Jose Additionally, or alternatively, message data 260 may include context for a sticker and/or post to be displayed on a user interface as or in association with a broadcast indication. For example, message data 260 may include a screen shot of a video call for use in post 146-1.

In some embodiments, message data 260 may additionally, or alternatively, include data concerning the context of the exchange message 250, such as a timestamp and/or geotag. Message data 260 may include privacy and/or other user settings associated with at least one user account. In some embodiments, message data 260 may include at least one indication of requested conversation sharing in association with at least one user account. For example, an exchange message 250 comprising a request to initiate a video call may include message data 260 containing a broadcast indication to be shared with one or more specified users in a participant list 258 upon successful call initiation. User accounts may be designated for various levels of involvement with a virtual conversation in or in association with a participant list 258. For example, a user account may be a call initiator, a call participant, a broadcast indication recipient, an invitation recipient, or other designation.

In some embodiments, participant data 256 may include data to be sent directly to one or more servers and/or client devices, as described herein. Alternatively, or additionally, participant data 256 may include one or more pointers to a location at which data is stored. The receiving device may then access the data subsequently to receiving the exchange message 250.

Data Flow and Exemplary Methods

FIGS. 3A-B depict data flow diagrams depicting exemplary information exchanges in a client device/server environment. Various embodiments, such as those illustrated in FIG. 2A, may implement such information exchanges. Embodiments may include more than one non-initiating client device **202-*i*, in which case, information exchange between communications server 218 and a non-initiating client device 202-2 may be performed between the communications server 218 and each non-initiating client device 2-*i*. However, for the sake of simplicity, only two involved client devices are illustrated with respect to FIGS. 3A-B**. Embodiments are not limited in this context.

FIG. 3A illustrates an information flow useful for managing initiation of a virtual conversation. An initiating client device 202-1, such as that illustrated in FIG. 2A, may transmit a request 302 to begin a virtual conversation with a non-initiating client device 202-2. The request 302 may be in the form of an exchange message 250, as illustrated in FIG. 2B. For example, an exchange message 250 may include a flag 252 indicating an initiation request for a video call, as well as participant data 256. In this example, participant data 256 may include a participant list 258, containing identifiers for initiating client device 202-1 as a sender and non-initiating client device 202-2 as a recipient of the request, and message data 260, containing user indicators for initiating client device 202-1 and non-initiating client device 202-2. An initiating client device 202-1 and a non-initiating client device 202-2 may be associated with the same or different digital communication platform and/or service.

In some embodiments, a call identifier may be determined and/or provided by a communications server 218, so a call identifier 254 field of an exchange message 250 for this purpose may be empty or not exist. In other embodiments, a call identifier may be determined by the initiating client device 202-1 prior to the sending of the request 302. In this example, the call identifier 254 may include the call identifier.

The request 302 may be generated by an application of the initiating client device 202-1 in response to determining that a virtual conversation is desired, such as in response to input received through a user interface of a device.

Upon receiving the request 302, the communications server 218 may, in embodiments, return call information 304 to the initiating client device. In some embodiments, a communications server may populate a call identifier 254 field in a call information exchange message 250, thereby enabling the initiating client device 202-1 to connect to a virtual conversation. For example, the communications server 218 may generate a collision key for the request 302. In other examples, an initiating client device 202-1 may generate a collision key to be included in an initial request 302. A collision key may be based on a call channel, a timestamp associated with the call, a participant list, other aspects of a call identifier 254, or any combination thereof in order to uniquely apply to a particular call.

Additionally, or alternatively, the communications server 218 may identify one or more non-initiating user devices to which the request 302 is directed (e.g., based on a participant list 258 in the exchange message 250) and may send an invitation 306 to the identified devices. The communications server 218 may identify request 302 recipients and/or send an invitation 306 in response to receiving a request 302. An invitation 306 may include one or more aspects of a request 302. For example, an invitation 306 may be a forwarded request 302. However, additional and/or different information may be included in an invitation 306, such as a call identifier 254. In some embodiments, a call identifier 254 may not be included in an invitation 306 or any other exchange message 250 to a client device until an acceptance of the invitation from the client device.

In some embodiments, an invitation 306 may include an invitation to log in, join, download, or otherwise participate in a digital communication service. In other embodiments, an invitation 306 may otherwise include options for an invited participant to join a virtual conversation without expressly downloading or joining a digital communication service. For example, an invitation 306 may include an link to a channel accessible outside of the digital communication service, such as a call line, a video conference channel, or other platform. The call line, video conference channel, or other platform may be accessible via a network connection outside of the digital communication service, enabling participants to interact with a virtual conversation of the invitation 306 without having to join and/or download a digital communication service which they had not before.

In some embodiments, an invitation 306 may include an invitation to a virtual conversation which is accessible only from an approved platform. For example, if a channel is accessed from an approved partner platform of the digital communication service, a virtual conversation of the channel may be accessed directly. In the same example, if a channel is not accessed from an approved partner platform of the digital communication service, an invitation to join, download, or otherwise participate in the digital communication service. When a participant with authenticated access to a partner platform of the digital communication service and accesses the invitation 306 from the partner platform, the user may not be required to authenticate their identity in order to access the call of the digital communication service. Authenticated access may be recognized based on a common user identifier between the partner platform and the digital communication service, an indicator on a response 308 corresponding with the invitation 306, reception of a response 308 corresponding with the invitation 306, or other method.

The communications server may receive a response 308 from a non-initiating client device 202-2. A response 308 may be an exchange message 250 comprising an acceptance or a denial of an invitation 306. In some embodiments, a communications server 218 may only receive a response 308 indicating an acceptance upon determination of acceptance of all aspects of an invitation 306. For example, determination may be based on broadcast information of an invitation 306 corresponding with settings of the non-initiating client device. Alternatively, or additionally, determination may be based on input received via a user interface of a non-initiating client device that a user has approved broadcast information associated with an invitation 306. In some embodiments, communications server 218 may receive a response 308 including a verification of the participant, for example, user log in information for a digital communication service.

In some embodiments, a response 308 may include a denial of an invitation 306. A denial may be based upon input received via a non-initiating client device 202-2 from a user. In some embodiments, a denial may be received via input or automated logic based on broadcast information of the invitation 306. In some embodiments, a response 308 may include, such as in message data 260, proposed alternative broadcast information.

For example, a response 308 may include a denial of an invitation 306 based on a non-initiating user's denial of a broadcast of the virtual conversation to all of the initiating user's friends in a social network graph. In this example, a response 308 may include proposed alternative information including an instruction to broadcast an indication of the conversation to a subset of mutual friends of the two users.

In response to receiving a response 308 with proposed alternative broadcast information, a communications server 218 may forward the response 308 to the initiating client device 202-1. In this case, an initiating client device 202-1 may send a new request 302 to a communications server 218 with the same or different broadcast information as included in the response 308. A secondary request 302 may include the same or a different call identifier 254 as that associated with the original request 302 and/or provided by the communications server 218.

The information exchange may proceed, in some embodiments, until the communications server 218 receives a response 308 indicating acceptance of an invitation 306 or the flow is otherwise interrupted, for example, by an additional request 302 or a response 308 not being received by the communications server 218 from a client device. In this way, a system may manage initiation of a virtual conversation based on coordinated broadcast directions from two or more devices.

Based on receiving a response 308 including an acceptance of an invitation 306, a communications server 218 may send call information 310 to one or more of the client devices. The call information 310 may include at least a call identifier 254 and an updated participant list 258 including the non-initiating client device 202-2 as a participant in the conversation.

In some embodiments, a response 308 may include a call identifier 254, for example, a collision key. A call identifier 254 of a response 308 may be the same or based on a call identifier received from a communications server 218 in an invitation 306. A communications server 218 may compare a call identifier 254 received in a response 254 to a call identifier received in or generated in response to a corresponding request 302. A communications server 218 may only send call information 310 to the non-initiating client device 202-2 based on a match between the call identifier 254 of the response 308 and the call identifier received in or generated in response to the corresponding request 302. Accordingly, a communications server 218 may only allow a non-initiating client device 202-2 to join a virtual conversation based on the direct invitation in a request 302 of the non-initiating client device 202-2 to the call. A communications server 218 may thus improve call security and/or improve call experience by decreasing the likelihood that a non-initiating client device 202-2 is improperly connected to a virtual conversation, for example, a virtual conversation of an unrelated request 302 received at the communications server 218.

FIG. 3B depicts an information flow for managing the broadcast of and/or participation in a virtual conversation after the initiation of the conversation. Either a first client device 312, a second client device 314, or neither may be an initiating client device 202-1 or a non-initiating client device 202-2. Embodiments are not limited in this context.

A first client device 312 may begin the information exchange of FIG. 3B to send a broadcast indication to a client device 314. Specifically, a first client device 312 may send a broadcast request 316. A broadcast request 316 may include an exchange message 250 containing at least a flag 252 indicating a broadcast indication and/or invitation, a participant list 258 including an identifier for the second client device 314, and message data 260 including data for display on a broadcast indication. In some embodiments, a broadcast request 316 may include a call identifier 254.

Upon receiving the broadcast request 316, the communications server 218 may identify the second client device 314 as a recipient based on the participant list 258 of the broadcast request 316. Accordingly, the communications server 218 may send a broadcast package 318 to a second client device 314. In some embodiments, a broadcast package 318 may include at least some aspects of the broadcast request 316. In some embodiments, a broadcast package 318 may include data formatted by the communications server 218. For example, a broadcast request 316 may include in message data 260 instructions for a broadcast indication including video data from the virtual conversation. In this example, a communications server 218 may compile data for a broadcast indication using audiovisual compilation logic 226. A broadcast package 318 may then include the compiled audiovisual data in message data 260.

In some embodiments, the information flow of FIG. 3B may end after the second client device 314 receives the broadcast package 318. However, selection of a broadcast indication at a second client device, for example, via a user interface, may result in a join request 320 being sent from the second client device 314 to the communications server 218. If a broadcast package 318 includes an invitation to join a virtual conversation, the join request 320 may include an indication of acceptance or denial of the invitation from the second client device 314.

If a join request 320 contains an acceptance of an invitation, call information 310 may be sent to both the first client device 312 and the second client device 314. Call information 310 may include a participant list 258 updated to contain an identifier for the second client device 314.

If a join request 320 contains a denial of an invitation, the join request 320 may be forwarded to the first client device 312 by the communications server 218 and the information flow stopped. Accordingly, a first client device may be informed of the denial of an invitation by another user.

In some embodiments, a broadcast package 318 may not include an invitation to join the call. Selection of a resulting broadcast indication at a second client device 314, then, may not direct a system to send an exchange message 250 from the second client device 314, and the user may be unable to join the virtual conversation.

Some embodiments, however, may enable a user of a second client device 314 to request participation in a virtual conversation even without receiving a broadcast indication containing an invitation. Specifically, selection of a broadcast indication at a second client device may result in the sending of a join request 320 to a communications server 218. The join request 320 may be relayed by the communications server 218 to the first client device 312. In some embodiments, a notification of the join request 320, including an identifier for the second client device, may be presented to a user via a user interface of the client device 312.

Based on acceptance of the join request 320 at the first client device 312, a join approval 322 may be sent to the communications server 218. Accordingly, aspects of call information 310 may be sent to the first client device 312 and/or the second client device 314. For example, call information 310 may be sent to both client devices including an updated participant list 258. In another example, call information 310 sent to a second client device 314 may include a call identifier 254, allowing the second client device 314 to join the call.

Accordingly, a system may provide flexibility for users to join virtual conversations even when left out of a list of invited participants, according to approval by a participant in the call. As a result, a new call need not be initiated if, for example, a participant forgets to invite a particular user to join a virtual conversation.

Figure 4A:
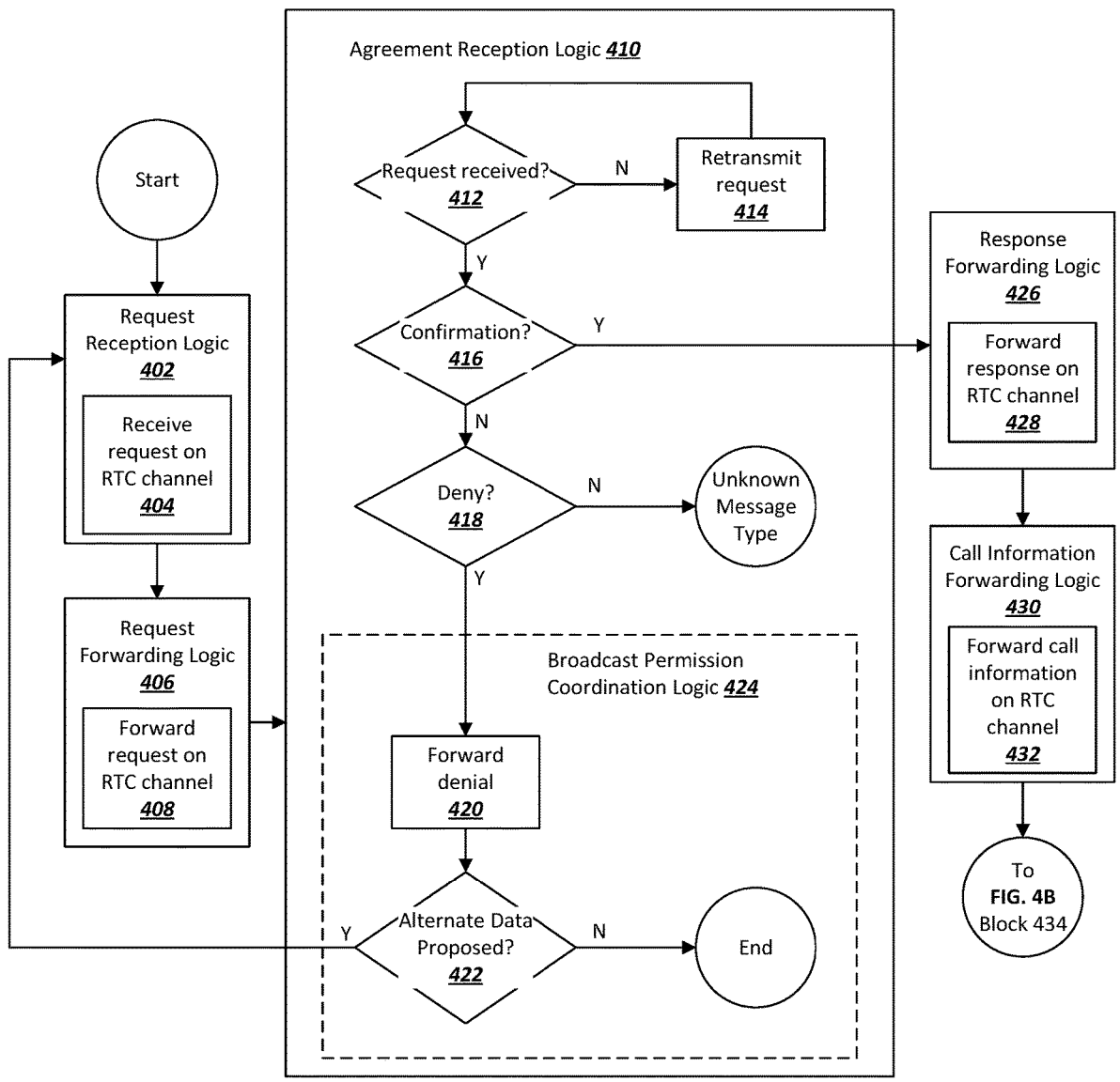
FIG. 4A-B depict a flowchart showing an exemplary method for coordinating and broadcasting a group call.
Figure 4B:
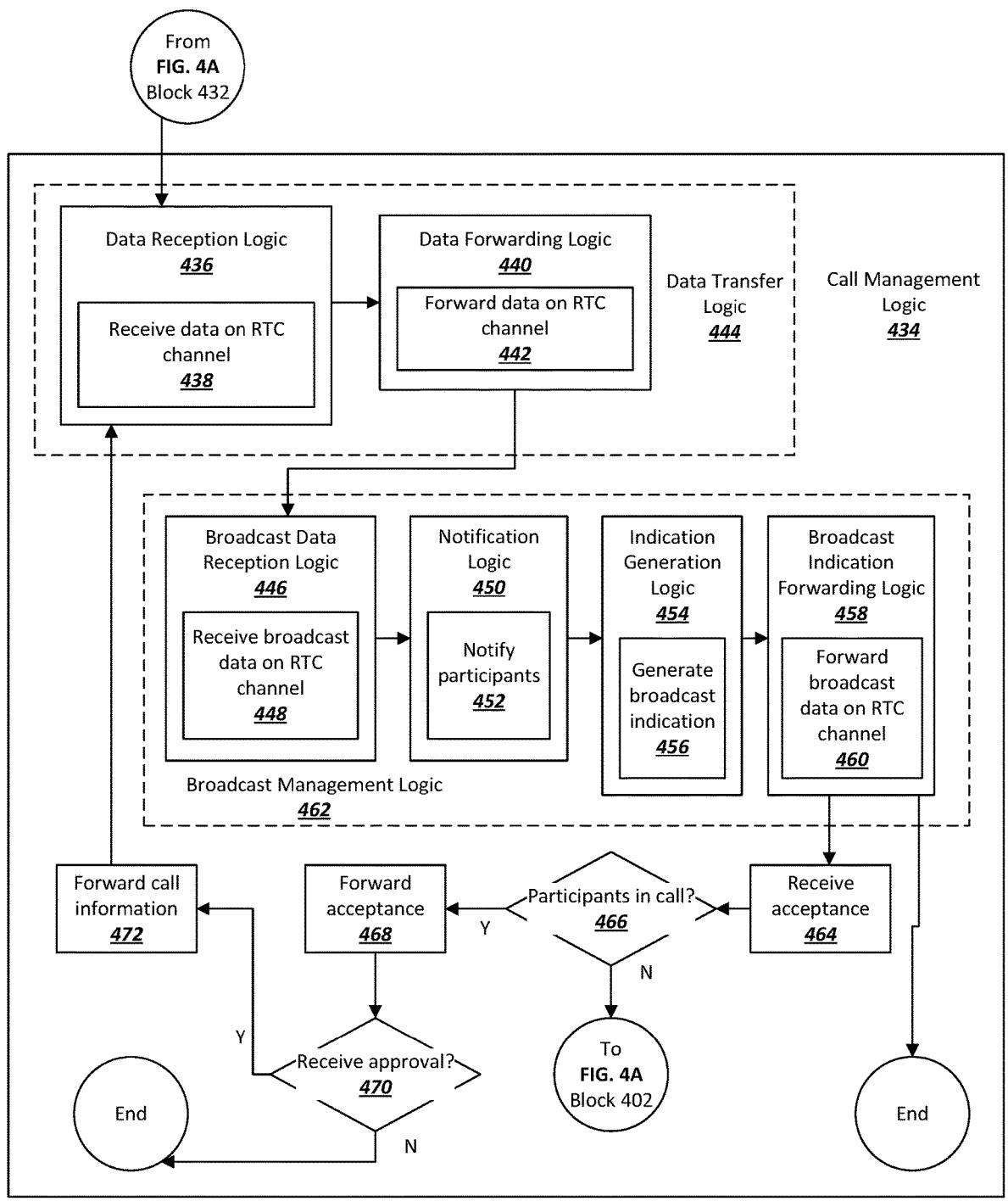

Next, exemplary logic 400A-B for broadcasting an indication of and/or managing participation in a virtual conversation are described in connection with FIGS. 4A-4B. FIGS. 4A-4B organize the logic block depicted into various groups of logics (e.g., request reception logic 402, request forwarding logic 406, etc.). In some embodiments, these logic modules may be provided on a communications server 218, as shown in FIG. 2A, although it is understood that such a configuration is not required. All of the modules may be implemented in the same device or may be distributed across any number of devices. Various combinations of modules may be employed on a given device, or the logic of an individual module may be performed by different devices.

Processing begins with request reception logic 402, which may engage a network interface to receive an instruction. The network interface may listen on an RTC channel for the instruction. The instruction may be a request to begin a virtual conversation received from an initiating client device 202-1 as described in connection with FIG. 3A.

At block 404, the system may receive a request for the initiation of a virtual conversation, for example, via a request 302. The virtual conversation may include a video call, a dedicated text message thread, an audio call, other call type, or a combination thereof. The system may identify one or more client devices associated with the call, such as an initiating client device 202-1 and at least one non-initiating client device 202-i. In some embodiments, the at least one non-initiating client device 202-i may be determined based on a selection from the initiating client device. A participant list 258 of a broadcast request 316 may identify the at least one non-initiating client device 202-i.

Processing may then be handed over to request forwarding logic 406. The request forwarding logic 406 may, at block 408, engage the network interface to forward the instruction to the non-initiating client devices identified in the instruction via an RTC channel, such as via logic described with respect to FIG. 3A.

Processing then may be handed over to agreement reception logic 410. Optionally, the agreement reception logic 410 may guarantee delivery of the instruction to the non-initiating client(s) by, for example, retransmitting the instruction to respective clients until the clients acknowledge receipt of the instruction or transmit a response message (blocks 412-414).

In response to the instruction, the non-initiating client may respond with one of several different types of messages on its RTC channel, for example, a response 308. At block 416, the system may determine if the response is a confirmation that the virtual conversation has been, or will be, started with the non-initiating client. If the determination at block 416 is "yes," then processing may be handed off to response forwarding logic 426.

If, on the other hand, the determination at block 416 is "no," then processing may proceed to block 418 and the system may determine if the message is a denial of the coordinated effect. If so, processing proceeds to block 420, where the system may forward the denial back to the initiating client.

A system may determine at block 422 whether a denial included alternate proposed broadcast information, such as discussed above. If not, the system may cancel the initiation of the virtual conversation or may initiate the virtual conversation with a subset of non-initiating clients. Processing may then end. However, if so, processing may return to request reception logic 402, at which point embodiments may receive additional request data, as outlined above.

Blocks 420 and 422 may together make up broadcast permission coordination logic 424. Steps may be performed in either order in various embodiments.

Response forwarding logic 426 may, at block 428, engage the network interface to forward the response, such as response 308, via an RTC channel to one or more devices as identified in a participant list 258.

Processing may then be handed over to call information forwarding logic 430. Call information forwarding logic 430 may, at block 432, forward call information via an RTC channel to one or more devices. Call information may include an updated participant list and be sent to the initiating client device and to one or more non-initiating client devices, as described above.

Turning to FIG. 4B, processing may proceed to data transfer logic 444, where the system may receive data regarding a virtual conversation. For example, data may include video data, audio data, text data, other media data useful for conducting a virtual conversation, or any combination thereof.

Specifically, processing may proceed from block 432 to data reception logic 436. At block 438, data reception logic may engage the network interface to receive data relating to a virtual conversation, for example, video data, on an RTC channel.

Processing may proceed to data forwarding logic 440. At block 442, logic may engage the network interface to forward data relating to a virtual conversation to one or more client devices participating in a virtual conversation. Data forwarding may, in some embodiments, be based on a call identifier, such as call identifier 254. In many embodiments, aspects of data reception logic 436 and data forwarding logic 440 may act at the same time or one after the other. For example, concurrent logic operations may enable the streaming of real-time or near real-time data. Together, data reception logic 436 and data forwarding logic 440 may make up data transfer logic 444.

From block 442, processing may be handed over to broadcast data reception logic 446. Broadcast data reception logic 446 may, at block 448, engage the network interface to receive broadcast data on an RTC channel, such as a broadcast request 316. From block 448, processing may be handed over to notification logic 450.

Notification logic 450 may, at block 452, notify participants of a received broadcast request. Notification may include sending an exchange message 250 from a broadcast server 228 to one or more devices participating in a virtual conversation. The exchange message 250 may include a flag 252 indicating a notification, and a participant list 258 may include one or more user identifiers associated with the broadcast request. Logic may identify recipients of a notification based on a participant list 258. In some embodiments, notification logic 450 may determine coordinated agreement of broadcast data between two or more users. In these cases, notification logic 450 may include similar logic, components, and/or functionality of and surrounding broadcast permission coordination logic 424.

Processing may be handed over to indication generation logic 454. At block 456, logic may generate a broadcast indication based on data received by broadcast data reception logic 446. For example, a broadcast indication may comprise an indication of the virtual conversation type, one or more user accounts participating in the virtual conversation, and/or media such as an image, video clip, GIF, sticker, a captured frame from the virtual conversation, or other video data.

Processing may be handed over to broadcast indication forwarding logic 458. The logic may, at block 460, forward broadcast information, such as a broadcast indication, on an RTC channel to one or more client devices. Broadcast information may be sent in accordance with a participant list 258 of a broadcast request 316, in some embodiments. Broadcast information may be sent to at least one additional user account not participating in the virtual conversation, according to a user setting of a participating user account and/or according to input received from a participating user account, as indicated in broadcast request 316.

Together, broadcast data reception logic 446, notification logic 450, and broadcast indication forwarding logic 458 may make up broadcast management logic 462. In some embodiments, broadcast management logic 462 may include one or more aspects of broadcast management logic 220.

In some embodiments, processing may end after block 460. However, a system may alternatively receive an indication of acceptance at block 464, such as via a user interface at a non-initiating client device. Acceptance may include a selection of a broadcast indication, such as described with respect to FIG. 3B. In some embodiments, an indication of acceptance may be a join request 320. As discussed in connection to FIG. 3B, a join request may be received based on a broadcast indication including an invitation or not including an invitation.

At block 466, call management logic 434 may determine if any participants are engaged in the virtual conversation. For example, in some cases, one, some, or each of the participants originally in a virtual conversation may have left the virtual conversation, such as by using an end call button 126-1 on a call interface 116-1.

If a virtual conversation is determined to include participants, the call management logic may proceed to connect the client device from which the acceptance was reached at block 464. Specifically, if an indication of acceptance received at block 464 was not based on a broadcast indication including an invitation, logic at block 468 may forward an acceptance received at block 464 to one or more participants in a virtual conversation. The forwarding of the acceptance may comprise a request to join the virtual conversation, such as join request 320.

If, at block 470, logic receives an approval, such as join approval 322, from one or more devices participating in a virtual conversation, the logic may forward call information to the one or more participating devices in a conversation, for example, with an updated participant list. Additionally, or alternatively, call logic may be forwarded to the device from which the acceptance was received at block 464, enabling the device to become a new participant in the virtual conversation.

Logic may then connect the new participant to the virtual conversation via data transfer logic 444. Data, such as video data, may be received from the new participant device at data reception logic 436 and forwarded to other participant devices by data forwarding logic 440.

If approval for a join request is not received at block 470, processing may end.

In some embodiments, if an acceptance received at block 464 based on a broadcast indication including an invitation, logic may proceed directly to block 472 and forward call information to one or more client devices. Block 472 may include similar logic and/or functionality as block 432. Accordingly, processing may be streamlined, reducing processing requirements.

In some embodiments, if an acceptance is received at block 464 but logic identifies at block 466 that there are no active participants in the virtual conversation, the logic may attempt to re-initiate the virtual conversation with one or more participants in the virtual conversation. For example, a system may present the client device of the acceptance at block 464 with the option to call back one or more of the virtual conversation participants. Confirmation via the user interface of the client device may be processed by request reception logic 402 as a request 302. Processing may thus be re-initiated with a new initiating client device 202-1, as described in connection with FIG. 3A. The re-initiated virtual conversation may be associated with the same or a new call identifier 254 as the original virtual conversation.

Processing described with respect to FIGS. 4A-B may be performed concurrently with respect to multiple devices. For example, a broadcast request processed by broadcast data reception logic 446 may be received from a client device different than that of an initial request 302 as processed at request reception logic 402. Functionality blocks such as data transfer logic 444 and broadcast management logic 462 may be performed concurrently, in some embodiments, so that virtual conversations and conversation broadcasting may be managed across a set of devices.

Single or multiple devices may perform aspects of the processing of FIGS. 4A-B. For example, aspects of agreement reception logic 410 and/or call management logic 434 may exist on a communications server 218, a broadcast server 228, and/or client devices such as an initiating client device 202-1 and/or a non-initiating client device 202-3.

Communication System Overview

Figure 5A:
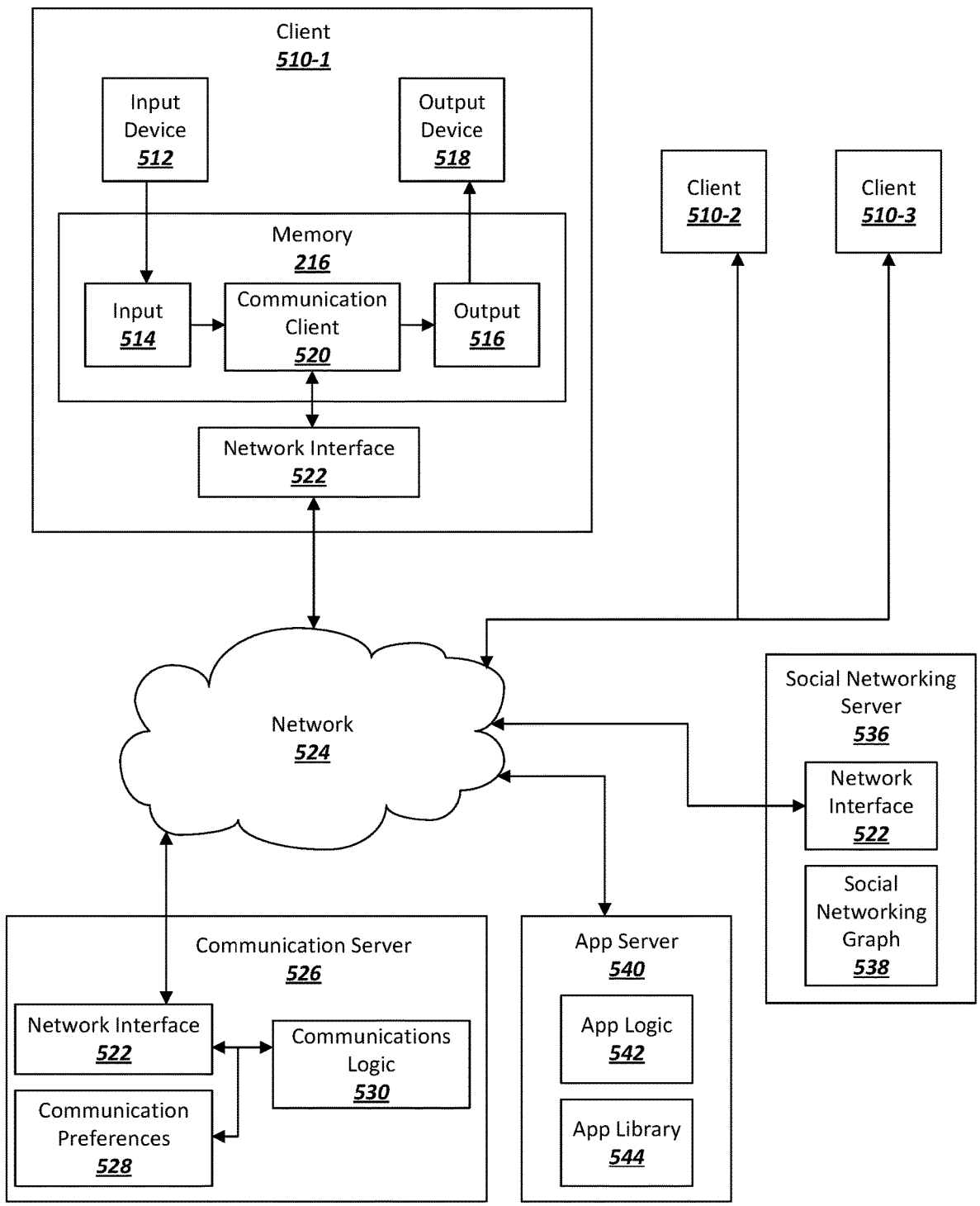
FIG. 5A is a block diagram providing an overview of a system including an exemplary centralized communications service.
Figure 5B:
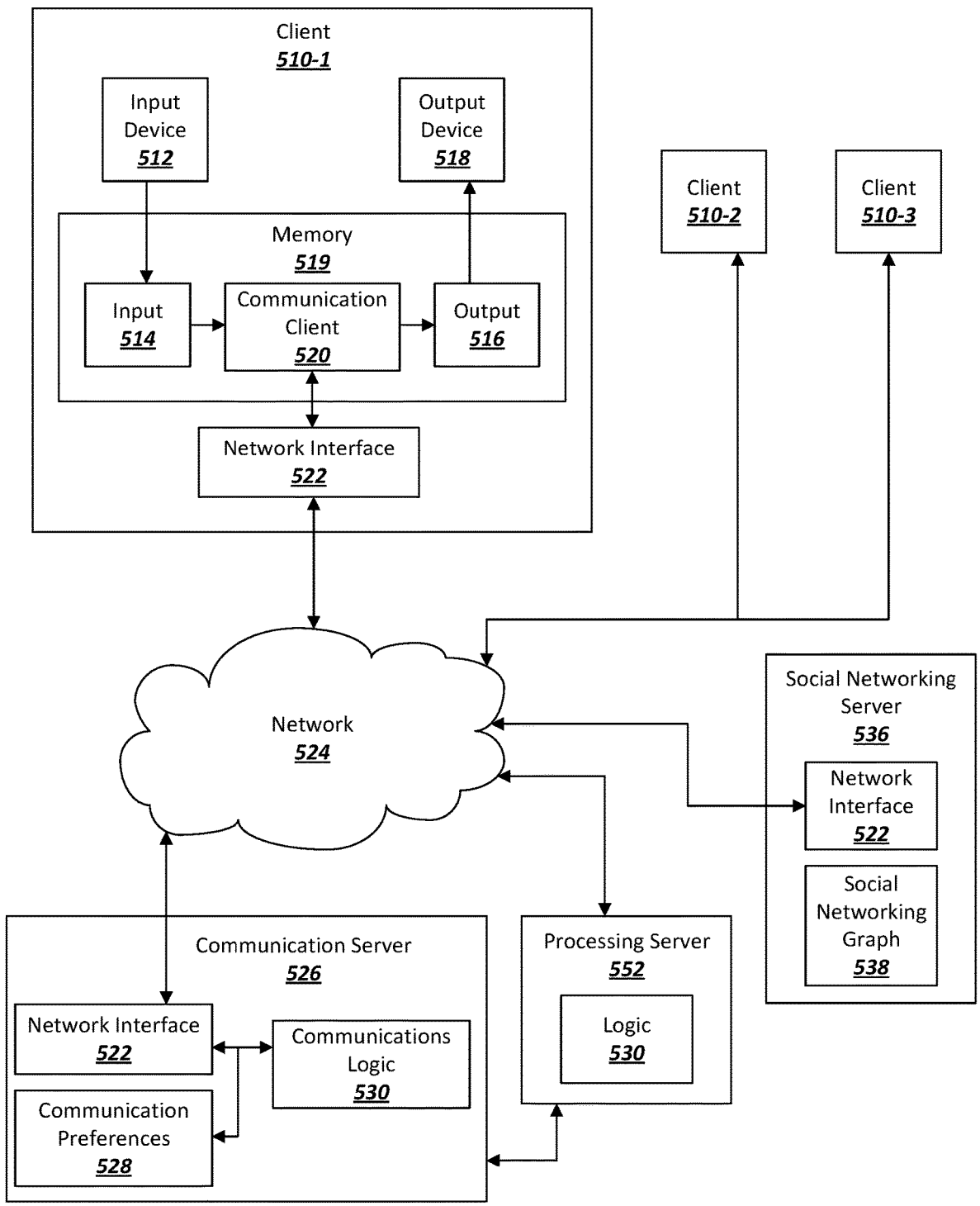
FIG. 5B is a block diagram providing an overview of a system including an exemplary distributed communications service.
Figure 5C:
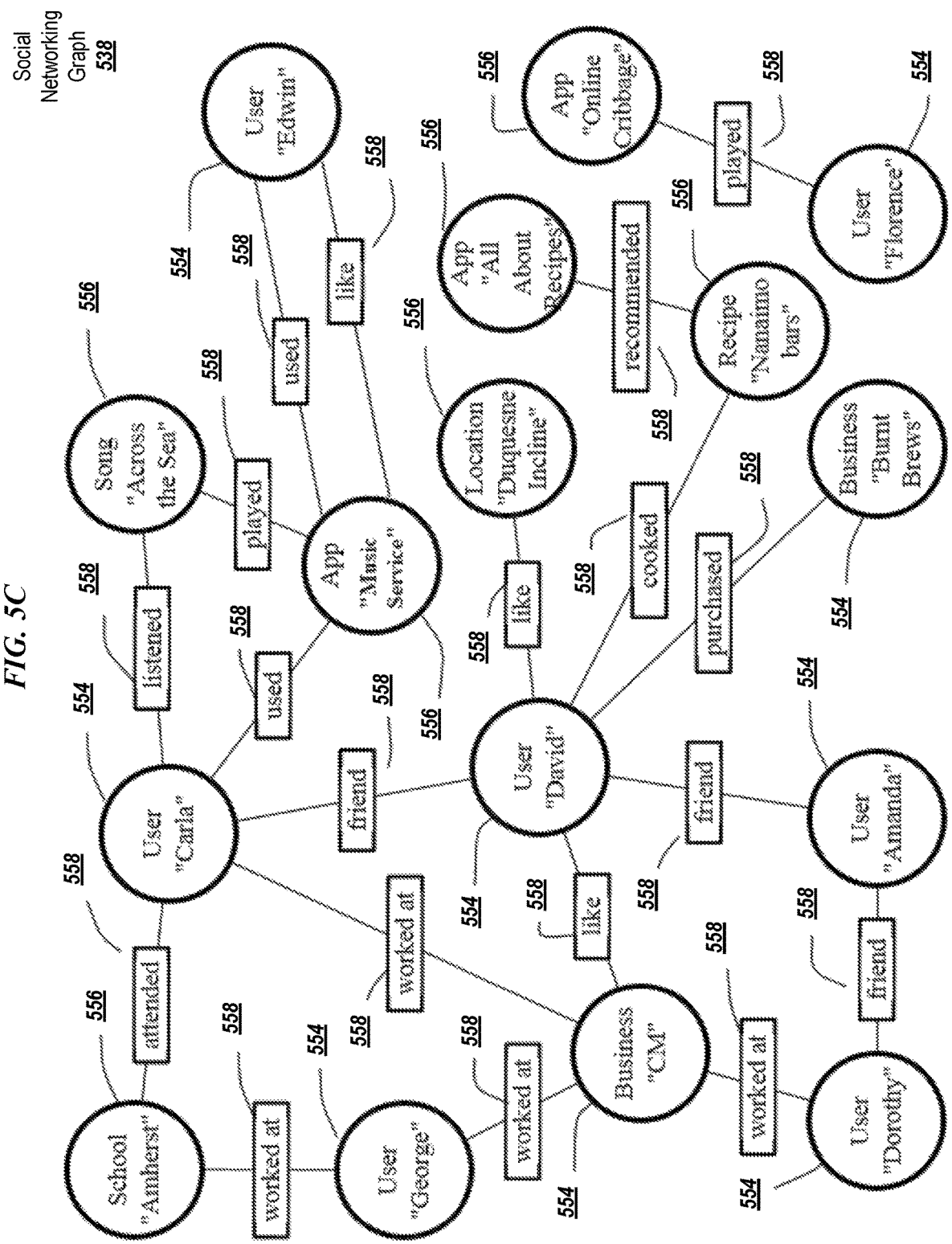
FIG. 5C depicts the social networking graph of FIGS. 5A-5B in more detail.

These examples may be implemented by a communications system that is provided either locally, at a client device, or remotely (e.g., at a remote server). FIGS. 5A-5C depict various examples of communications systems and are discussed in more detail below.

FIG. 5A depicts an exemplary centralized communication system 500, in which functionality such as that described above is integrated into a communication server. The centralized communication system 500 may implement some or all of the structure and/or operations of a communication service in a single computing entity, such as entirely within a single centralized communication server 526. Embodiments are not limited in this context.

The centralized communication system 500 may include a computer-implemented system having software applications that include one or more components. Although the centralized communication system 500 shown in FIG. 5A has a limited number of elements in a certain topology, the centralized communication system 500 may include more or fewer elements in alternate topologies.

A centralized communication system 500 may be generally arranged to receive, store, and deliver messages. The centralized communication system 500 may store messages or video communications while communication clients 520, such as may execute on client devices 510, are offline and deliver the messages/communications once the clients are available. Alternatively, or additionally, the clients 520 may include social networking functionality.

A client device 510 may transmit messages addressed to a recipient user, user account, or other identifier resolving to a receiving client device 510. In exemplary embodiments, each of the client devices 510 and their respective communication clients 520 are associated with a\ particular user or users of the centralized communication system 500. In some embodiments, the client devices 510 may be cellular devices such as smartphones and may be identified to the centralized communication system 500 based on a phone number associated with each of the client devices 510. In some embodiments, each communication client may be associated with a user account registered with the centralized communication system 500. In general, each communication client may be addressed through various techniques for the reception of messages. For example, client devices 510 may be client devices 202, as described above. While in some embodiments the client devices 510 may be cellular devices, in other embodiments one or more of the client devices 510 may be personal computers, tablet devices, any other form of computing device.

The client device 510 may include one or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the centralized communication system 500.

The client device 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a communication client 520 and/or a social networking client that allows a user to interact with a social networking service.

The input 514 may be textual, such as in the case where the input device comprises a keyboard, such as via user interface 102-1. Alternatively, the input 514 may be an audio recording, such as in the case where the input device 512 is a microphone. Accordingly, the input 514 may be subjected to automatic speech recognition (ASR) logic in order to transform the audio recording to text that is processable by the centralized communication system 500. The ASR logic may be located at the client device 510 (so that the audio recording is processed locally by the client device 510 and corresponding text is transmitted to the communication server 526), or may be located remotely at the communication server 526 (in which case, the audio recording may be transmitted to the communication server 526 and the communication server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 514 into processable text.

The client device 510 may be provided with a network interface 522 for communicating with a network 524, such as the Internet. The network interface 522 may transmit the input 514 in a format and/or using a protocol compatible with the network 524 and may receive a corresponding output 516 from the network 524.

The network interface 522 may communicate through the network 524 to a communication server 526. The communication server 526 may be operative to receive, store, and forward communications between clients. In some embodiments, a communication server 526 may be a communications server 218 and/or a broadcast server 228.

The communication server 526 may include a network interface 522, communication preferences 528, and communications logic 530. The communication preferences 528 may include one or more privacy settings or other preferences for one or more users and/or message threads. Furthermore, the communication preferences 528 may include one or more settings, including default settings, for the logic described herein.

The communications logic 530 may include logic for implementing any or all of the above-described features of the present invention. Alternatively or in addition, some or all of the features may be implemented at the client device 510-i, such as by being incorporated into an application such as the communication client 520.

The network interface 522 of the client device 510 and/or the communication server 526 may also be used to communicate through the network 524 with an app server 540. The app server may store software or applications in an app library 544, representing software available for download by the client device 510-i and/or the communication server 526 (among other entities). An app in the app library 544 may fully or partially implement the embodiments described herein. Upon receiving a request to download software incorporating exemplary embodiments, app logic 542 may identify a corresponding app in the app library 544 and may provide (e.g., via a network interface) the app to the entity that requested the software.

The network interface 522 of the client device 510 and/or the communication server 526 may also be used to communicate through the network 524 with a social networking server 536. The social networking server 536 may include or may interact with a social networking graph 538 that defines connections in a social network. Furthermore, the communication server 526 may connect to the social networking server 536 for various purposes, such as retrieving connection information, communication history, event details, etc. from the social network.

A user of the client device 510 may be an individual (human user), an entity (e.g., an enterprise, business, or third-party application), or a group (e.g., of individuals or entities) that interacts or communicates with or over the social networking server 536. The social networking server 536 may be a network-addressable computing system hosting an online social network. The social networking server 536 may generate, store, receive, and send social networking data, such as, for example, user-profile data, concept-profile data, social-graph information, or other suitable data related to the online social network. The social networking server 536 may be accessed by the other components of the network environment either directly or via the network 524. In some embodiments, a communication server 526 may comprise a social networking server 536.

The social networking server 536 may include an authorization server (or other suitable component(s)) that allows users to opt in to or opt out of having their actions logged by social networking server 536 or shared with other systems (e.g., third-party systems, such as the communication server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 536 may send a request to the data store for the object. The request may identify the user associated with the request. The requested data object may only be sent to the user (or a client device 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the logic for implementing exemplary embodiments is incorporated into the communication server 526. In contrast, FIG. 5B depicts an exemplary distributed communication system 550, in which functionality for implementing exemplary embodiments is distributed and remotely accessible from the communication server. Examples of a distributed communication system 550 include a client server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity (the app server 540 is omitted from the Figure for ease of discussion, although it is understood that this embodiment may also employ an app server 540). The primary difference between the centralized embodiment and the distributed embodiment is the addition of a separate processing server 552, which hosts the logic 530 for implementing exemplary embodiments. The processing server 552 may be distinct from the communication server 526 but may communicate with the communication server 526, either directly or through the network 524, to provide the functionality of the logic 530 to the communication server 526.

The embodiment depicted in FIG. 5B may be particularly well suited to allow exemplary embodiments to be deployed alongside existing communication systems, for example when it is difficult or undesirable to replace an existing communication server. Additionally, in some cases the communication server 526 may have limited resources (e.g. processing or memory resources) that limit or preclude the addition of the additional pivot functionality. In such situations, the capabilities described herein may still be provided through the separate processing server 552.

In still further embodiments, the logic 530 may be provided locally at the client device 510-*i*, for example as part of the communication client 520. In these embodiments, each client device 510-*i* makes its own determination as to which messages belong to which thread, and how to update the display and issue notifications. As a result, different client devices 510-*i* may display the same conversation differently, depending on local settings (for example, the same messages may be assigned to different threads, or similar threads may have different parents or highlights).

FIG. 5C illustrates an example of a social networking graph 538. In exemplary embodiments, a social networking service may store one or more social networking graphs 538 in one or more data stores as a social networking graph data structure via the social networking service.

The social networking graph 538 may include multiple nodes, such as user nodes 554 and concept nodes 556. The social networking graph 538 may furthermore include edges 558 connecting the nodes. The nodes and edges of social networking graph 538 may be stored as data objects, for example, in a data store (such as a social-graph database). Such a data store may include one or more searchable or queryable indexes of nodes or edges of social networking graph 538.

The social networking graph 538 may be accessed by a communications server 218, broadcast server 228, devices of environment 200, third-party system, or any other approved system or device for suitable applications.

A user node 554 may correspond to a user of the social networking system. A user may be an individual (human user), an entity (e.g., an enterprise, business, or third-party application), or a group (e.g., of individuals or entities) that interacts or communicates with or over the social networking system. In exemplary embodiments, when a user registers for an account with the social networking system, the social networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social networking system. In particular embodiments, a user node 554 may be associated with information provided by a user or information gathered by various systems, including the social networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social networking graph 538 may represent or be represented by a webpage (which may be referred to as a "profile page"). Profile pages may be hosted by or accessible to the social networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social networking system a message indicating the user's action. In response to the message, the social networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social networking graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social networking system may send a "friend request" to the second user. If the second user confirms the "friend request," the social networking system may create an edge 558 connecting the first user's user node 554 to the second user's user node 554 in social networking graph 538 and store edge 558 as social-graph information in one or more data stores. In the example of FIG. 5C, social networking graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social networking graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social networking system may create a "favorite" edge or a "check in" edge in response to a user's action corresponding to a respective action. As another example and not by way of limitation, a user (user "Carla") may listen to a particular song ("Across the Sea") using a particular application (Music Service, which is an online music application). In this case, the social networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (Music Service) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "Music Service").

In particular embodiments, the social networking system may create an edge 558 between a user node 554 and a concept node 556 in social networking graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social networking system a message indicating the user's liking of the concept associated with the concept-profile page. In response to the message, the social networking system may create an edge 558 between user node 554 associated with the user and concept node 556, as illustrated by "like" edge 558 between the user and concept node 556. In particular embodiments, the social networking system may store an edge 558 in one or more data stores. In particular embodiments, an edge 558 may be automatically formed by the social networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social networking graph 538 may further comprise a plurality of product nodes. Product nodes may represent particular products that may be associated with a particular business. A business may provide a product catalog to a consumer-to-business service and the consumer-to-business service may therefore represent each of the products within the product in the social networking graph 538 with each product being in a distinct product node. A product node may comprise information relating to the product, such as pricing information, descriptive information, manufacturer information, availability information, and other relevant information. For example, each of the items on a menu for a restaurant may be represented within the social networking graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social networking graph 538. The information for a product node may be manipulated by the social networking system as a product object that encapsulates information regarding the referenced product.

As such, the social networking graph 538 may be used to infer shared interests, shared experiences, or other shared or common attributes of two or more users of a social networking system. For instance, two or more users each having an edge to a common business, product, media item, institution, or other entity represented in the social networking graph 538 may indicate a shared relationship with that entity, which may be used to suggest customization of a use of a social networking system, including a messaging system, for one or more users.

The embodiments described above may be performed by a messaging architecture, an example of which is next described with reference to FIG. 6.

Messaging Architecture

FIG. 6 illustrates an embodiment of a plurality of servers implementing various functions of a messaging service 600. It will be appreciated that different distributions of work and functions may be used in various embodiments of a messaging service 600. While messaging service 600 will be described with respect to text-based conversations for the sake of simplicity, it will be understood that one or more elements may be applied to other types of virtual conversations, such as video calls. For example, a messaging service 600 may be implemented using a user interface as described with respect to FIGS. 1A-D, be useful for supporting an environment as described with respect to FIGS. 2A-B, and house one or more components of information flows of FIGS. 3A-B.

The messaging service 600 may comprise a domain name front end 602. The domain name front end 602 may be assigned one or more domain names associated with the messaging service 600 in a domain name system (DNS). The domain name front end 602 may receive incoming connections and distribute the connections to servers providing various messaging services.

The messaging service 600 may comprise one or more chat servers 604. The chat servers 604 may comprise front-end servers for receiving and transmitting user-to-user messaging updates such as chat messages. Incoming connections may be assigned to the chat servers 604 by the domain name front end 602 based on workload balancing.

The messaging service 600 may comprise backend servers 608. The backend servers 608 may perform specialized tasks in the support of the chat operations of the front-end chat servers 604. A plurality of different types of backend servers 608 may be used. It will be appreciated that the assignment of types of tasks to different backend servers 608 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 600 may comprise a network bus 606, useful for enabling cooperation between the domain name front end 602, chat servers 604, and/or components of backend servers 608.

The messaging service 600 may comprise one or more offline storage servers 610. The one or more offline storage servers 610 may store messaging content for currently-offline messaging clients in hold for when the messaging clients reconnect.

The messaging service 600 may comprise one or more sessions servers 612. The one or more session servers 612 may maintain session state of connected messaging clients.

The messaging service 600 may comprise one or more presence servers 614. The one or more presence servers 614 may maintain presence information for the messaging service 600. Presence information may correspond to user-specific information indicating whether or not a given user has an online messaging client and is available for chatting, has an online messaging client but is currently away from it, does not have an online messaging client, and any other presence state.

The messaging service 600 may comprise one or more push storage servers 616. The one or more push storage servers 616 may cache push requests and transmit the push requests to messaging clients. Push requests may be used to wake messaging clients, to notify messaging clients that a messaging update is available, and to otherwise perform server-side-driven interactions with messaging clients.

The messaging service 600 may comprise one or more group servers 618. The one or more group servers 618 may maintain lists of groups, add users to groups, remove users from groups, and perform the reception, caching, and forwarding of group chat messages. Some embodiments may use group data from group servers 618 to curate participant lists 258, as described in greater detail above. Participant list 258 curation may be based on user input, such as selection of a group stored in group servers 618, or in accordance with a user setting. For example, groups of group servers 618 may be associated with one or more privacy settings.

The messaging service 600 may comprise one or more block list servers 620. The one or more block list servers 620 may maintain user-specific block lists, the user-specific incoming block lists indicating for each user the one or more other users that are forbidden from transmitting messages to that user. Alternatively, or additionally, the one or more block list servers 620 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information. The messaging service 600 may include one or more last seen information servers 622. The one or more last seen information servers 622 may receive, store, and maintain information indicating the last seen location, status, messaging client, and other elements of a user's last seen connection to the messaging service 600.

The messaging service 600 may comprise one or more key servers 624. The one or more key servers may host public keys for public/private key encrypted communication.

The messaging service 600 may comprise one or more profile photo servers 626. The one or more profile photo servers 626 may store and make available for retrieval profile photos for the plurality of users of the messaging service 600. Some embodiments may include profile photos from profile photo servers 626 in broadcast indications, for example, as described above with respect to FIG. 1.

The messaging service 600 may comprise one or more spam logging servers 628. The one or more spam logging servers 628 may log known and suspected spam (e.g., unwanted messages, particularly those of a promotional nature). The one or more spam logging servers 628 may be operative to analyze messages to determine whether they are spam and to perform punitive measures, in some embodiments, against suspected spammers (users that send spam messages).

The messaging service 600 may comprise one or more statistics servers 630. The one or more statistics servers may compile and store statistics information related to the operation of the messaging service 600 and the behavior of the users of the messaging service 600.

The messaging service 600 may comprise one or more web servers 632. The one or more web servers 632 may engage in hypertext transport protocol (HTTP) and hypertext transport protocol secure (HTTPS) connections with web browsers.

The messaging service 600 may comprise one or more chat activity monitoring servers 634. The one or more chat activity monitoring servers 634 may monitor the chats of users to determine unauthorized or discouraged behavior by the users of the messaging service 600. The one or more chat activity monitoring servers 634 may work in cooperation with the spam logging servers 628 and block list servers 620, with the one or more chat activity monitoring servers 634 identifying spam or other discouraged behavior and providing spam information to the spam logging servers 628 and blocking information, where appropriate to the block list servers 620.

The messaging service 600 may comprise one or more sync servers 636. The one or more sync servers 636 may sync the communication server 526 with contact information from a messaging client, such as an address book on a mobile phone, to determine contacts for a user in the messaging service 600.

The messaging service 600 may comprise one or more multimedia servers 638. The one or more multimedia servers may store multimedia (e.g., images, video, audio) in transit between messaging clients, multimedia cached for offline endpoints, and may perform transcoding of multimedia.

The messaging service 600 may comprise one or more payment servers 640. The one or more payment servers 640 may process payments from users. The one or more payment servers 640 may connect to external third-party servers for the performance of payments. The messaging service 600 may comprise one or more registration servers 642. The one or more registration servers 642 may register new users of the messaging service 600.

The messaging service 600 may comprise one or more voice relay servers 644. The one or more voice relay servers 644 may relay voice-over-internet-protocol (VoIP) voice communication between messaging clients for the performance of VoIP calls.

Figure 7:
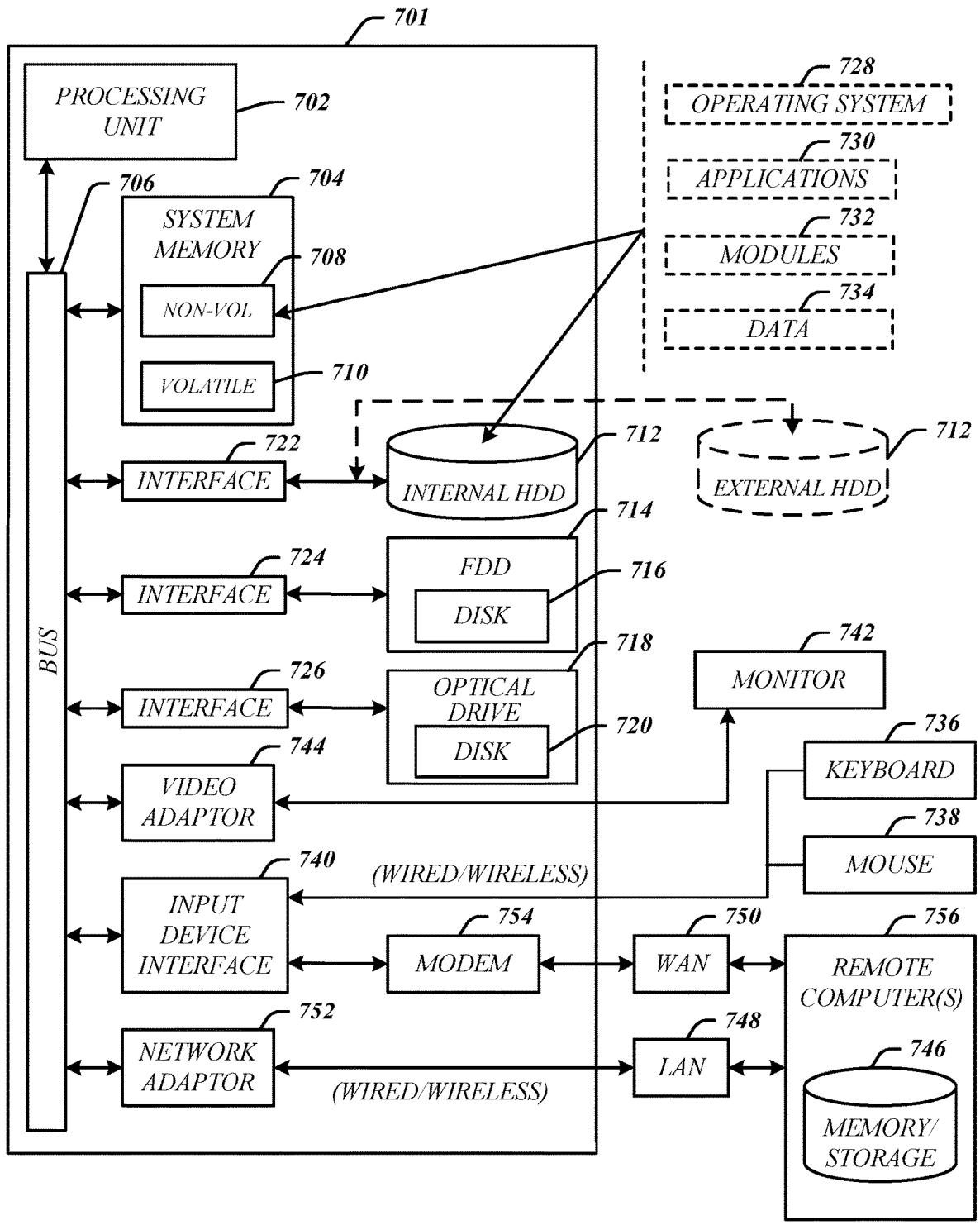
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. For example, a computing architecture 700 may be useful for implementing a client device 202 and/or one or more aspects of environment 200. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an Athlon®, Duron® and Opteron® processors; embedded and secure processors; DragonBall® and PowerPC® processors; Cell processors; Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the nonvolatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging service 600.

A user can enter commands and information into the computer 701 through one or more wire/wireless input devices, for example, a keyboard 736 and a pointing device, such as a mouse 738. Other input devices may include microphones, infra-red (IR) remote controls, radiofrequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 756. The remote computer 756 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
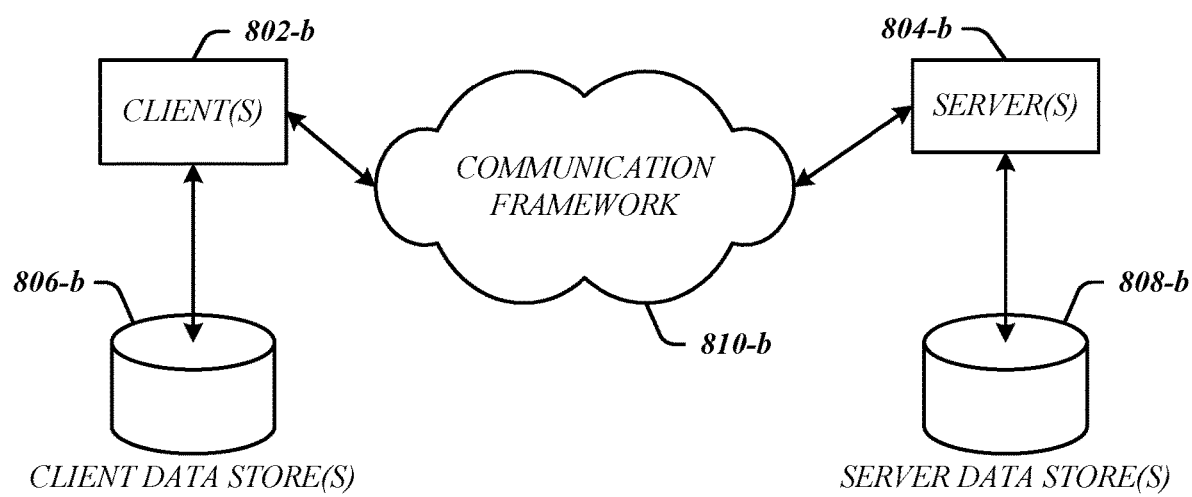
FIG. 8 depicts an exemplary communication architecture.

FIG. 8 is a block diagram depicting an exemplary communications architecture 800 suitable for implementing various embodiments as previously described. For example, communications architecture 800 may be useful for implementing the environment of FIG. 2A. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510 or client devices 202. The servers 804 may implement the communications server 218, broadcast server 228, and/or communication server 526, for example. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
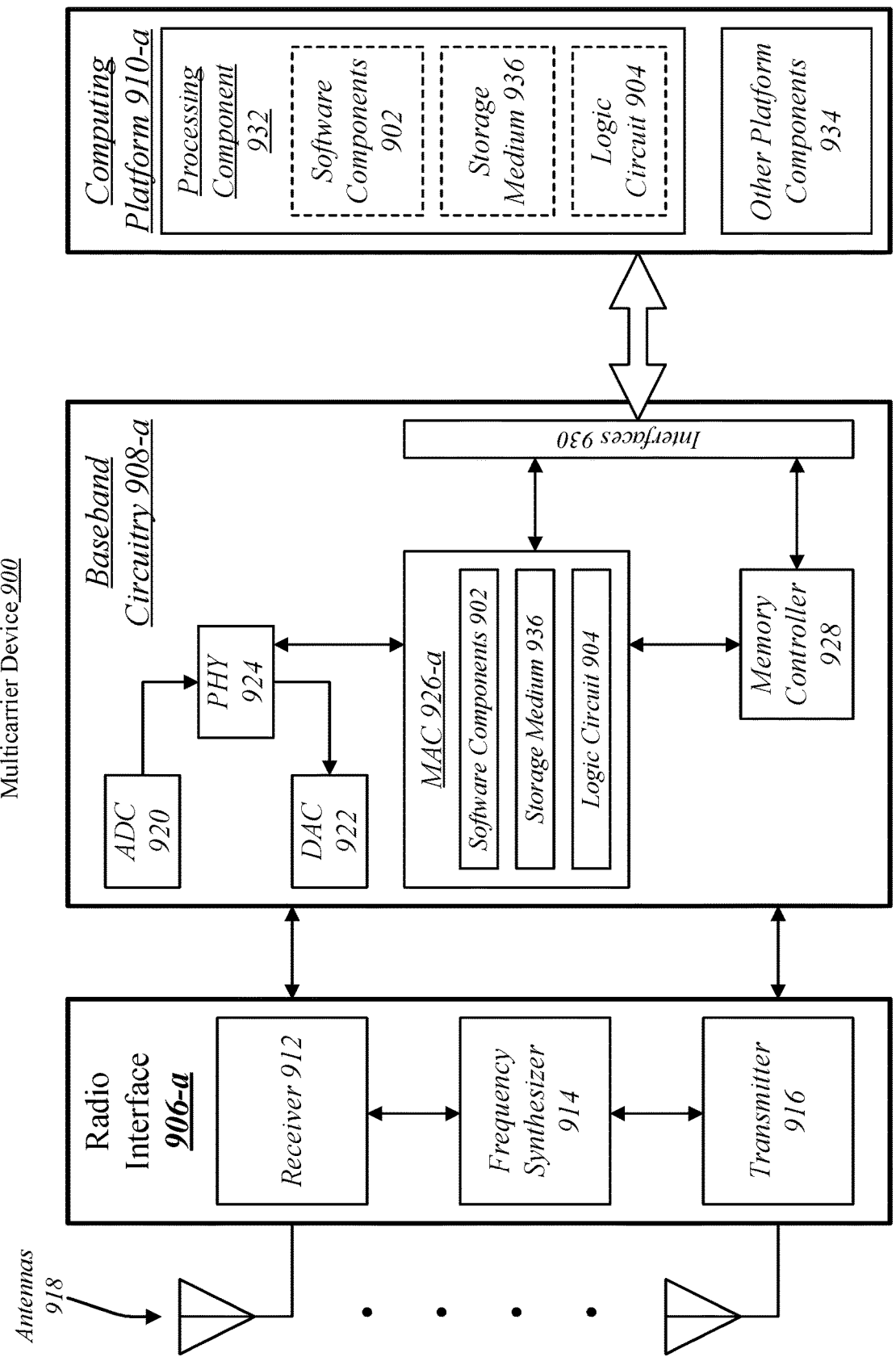
FIG. 9 is a block diagram depicting an exemplary multicarrier communications device.

FIG. 9 illustrates an embodiment of a device 900 for use in a multicarrier OFDM system, such as the messaging service 600. The device 900 may implement, for example, software components 902 as described with reference to the messaging request reception logic 402, request forwarding logic 406, agreement reception logic 410, response forwarding logic 426, call information logic 430, and/or call management logic 434. The device 900 may also implement a logic circuit 904. The logic circuit 904 may include physical circuits to perform operations described for the messaging service 600. As shown in FIG. 9, device 900 may include a radio interface 906, baseband circuitry 908, and a computing platform 910, although embodiments are not limited to this configuration.

The device 900 may implement some or all of the structure and/or operations for the messaging service 600 and/or logic circuit 904 in a single computing entity, such as entirely within a single device. Alternatively, the device 900 may distribute portions of the structure and/or operations for the messaging service 600 and/or logic circuit 904 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 906 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 906 may include, for example, a receiver 912, a transmitter 914 and/or a frequency synthesizer 916. The radio interface 906 may include bias controls, a crystal oscillator and/or one or more antennas 918. In another embodiment, the radio interface 906 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 908 may communicate with the radio interface 906 to process receive and/or transmit signals and may include, for example, an analog-to-digital converter 920 for down converting received signals, and a digital-to-analog converter 922 for up-converting signals for transmission. Further, the baseband circuitry 908 may include a baseband or physical layer (PHY) processing circuit 924 for PHY link layer processing of respective receive/transmit signals. The baseband circuitry 908 may include, for example, a processing circuit 926 for medium access control (MAC)/data link layer processing. The baseband circuitry 908 may include a memory controller 928 for communicating with the processing circuit 926 and/or a computing platform 910, for example, via one or more interfaces 930.

In some embodiments, the PHY processing circuit 924 may include a frame construction and/or detection module, in combination with additional circuitry such as a buffer memory, to construct and/or deconstruct communication frames, such as radio frames. Alternatively or in addition, the MAC processing circuit 926 may share processing for certain of these functions or perform these processes independent of the PHY processing circuit 924. In some embodiments, MAC and PHY processing may be integrated into a single circuit.

The computing platform 910 may provide computing functionality for the device 900. As shown, the computing platform 910 may include a processing component 932. In addition to, or alternatively of, the baseband circuitry 908, the device 900 may execute processing operations or logic for the messaging service 600 and logic circuit 904 using the processing component 932. The processing component 932 (and/or the PHY 924 and/or MAC 926) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 910 may further include other platform components 934. Other platform components 934 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 900 described herein, may be included or omitted in various embodiments of the device 900, as suitably desired. In some embodiments, the device 900 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of the device 900 may be implemented using any combination of discrete circuitry, application specific integrated circuits (ASICs), logic gates and/or single chip architectures. Further, the features of the device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 936 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method comprising:
   initiating a video call between a set of user accounts comprising a first user account and one or more other user accounts, the video call carried out via at least a data channel and a real time communication (RTC) channel distinct from the data channel;
   generating an exchange message comprising (i) an indicator related to an indication of participation in the video call, (ii) a call identifier uniquely identifying the video call, and (iii) participant data related to any one of the set of user accounts; and
   sending the exchange message via the RTC channel to at least one additional user account not in the set of user accounts, the indication of participation displayed on a graphical user interface (GUI) associated with the at least one additional user account.

2. The method of claim 1, wherein the indication of participation comprises a captured frame from the video call, a graphics interchange format (GIF) file, a sticker, a video clip, or video data from the video call.

3. The method of claim 1, wherein the at least one additional user account is selected from a plurality of user accounts based on a user account setting.

4. The method of claim 1, wherein the at least one additional user account is selected from a plurality of user accounts based on input from at least one of the set of user accounts.

5. The method of claim 1, wherein the operations further comprise sending a notification to at least one user account of the set of user accounts, the notification communicating the display of the indication of participation for the at least one additional user account.

6. The method of claim 1, wherein the indication of participation comprises an invitation to join the video call.

7. The method of claim 6, wherein the operations further comprise receiving a selection of the indication of participation from the at least one additional user account, and
   if the video call is ongoing, adding the at least one additional user account to the video call based on the selection, and
   if all user accounts of the set of user accounts have ended participation in the video call, attempting to re-initiate the video call with the set of user accounts and the at least one additional user account based on the selection.

8. At least one non-transitory computer-readable storage medium comprising instructions that, when executed, cause a system to:

initiate a video call between a set of user devices comprising a first user device and one or more other user devices, the video call carried out via at least a data channel and a real time communication (RTC) channel distinct from the data channel;

generate an exchange message comprising (i) an indicator related to an indicating of participation in the video call, (ii) a call identifier uniquely identifying the video call, and (iii) participant data related to any one of the set of user accounts; and send the exchange message via the RTC channel to at least one additional user device not in the set of user devices, the indication of participation to be displayed on a graphical user interface (GUI) associated with the at least one additional user account.

9. The at least one non-transitory computer-readable storage medium of claim 8, wherein the indication of participation comprises a captured frame from the video call, a graphics interchange format (GIF) file, a sticker, a video clip, or video data from the video call.

10. The at least one non-transitory computer-readable storage medium of claim 8, comprising further instructions that, when executed, cause a system to select the at least one additional user device from a plurality of user devices based on a user account setting associated with at least one user device in the set of user devices.

11. The at least one non-transitory computer-readable storage medium of claim 8, comprising further instructions that, when executed, cause a system to select the at least one additional user device from a plurality of user devices based on input from at least one of the set of user devices.

12. The at least one non-transitory computer-readable storage medium of claim 8, comprising further instructions that, when executed, cause a system to send a notification to at least one user device of the set of user devices, the notification communicating the display of the indication of participation for the at least one additional user device.

13. The at least one non-transitory computer-readable storage medium of claim 8, wherein the indication of participation comprises an invitation to join the video call.

14. The at least one non-transitory computer-readable storage medium of claim 13, comprising further instructions that, when executed, cause a system to receive a selection of the indication from the at least one additional user device, and if the video call is ongoing, add the at least one additional user device to the video call based on the selection, and if all user accounts of the set of user accounts have ended participation in the video call, attempt to re-initiate the video call with the set of user devices and the at least one additional user device based on the selection.

15. An apparatus, comprising:

at least one processor operable to execute stored instructions that, when executed, cause the at least one processor to:

initiate a video call between a set of users comprising a first user and one or more other users, the video call carried out via at least a data channel and a real time communication (RTC) channel distinct from the data channel;

generate an exchange message comprising (i) an indicator related to an indication of participation in the video call, (ii) a call identifier uniquely identifying the video call, and (iii) participant data related to any one of the set of user accounts; and send the exchange message via the RTC channel to a device associated with an additional user not in the set of users, the indication displayed on a graphical user interface (GUI) associated with the at least one additional user account.

16. The apparatus of claim 15, wherein the indication of participation comprises a captured frame from the video call, a graphics interchange format (GIF) file, a sticker, a video clip, or video data from the video call.

17. The apparatus of claim 15, wherein the at least one additional user account is selected from a plurality of user accounts based on input from at least one of the set of user accounts.

18. The apparatus of claim 15, further comprising notification logic configured to send a notification to at least one user of the set of users, the notification communicating the display of the indication of participation for the at least one additional user.

19. The apparatus of claim 15, wherein the indication of participation comprises an invitation to join the video call.

20. The apparatus of claim 19, further comprising call management logic to receive a selection of the indication from the at least one additional user account, and if the video call is ongoing, add the at least one additional user account to the video call based on the selection, and if all user accounts of the set of user accounts have ended participation in the video call, attempt to re-initiate the video call with the set of user accounts and the at least one additional user account based on the selection.

\* \* \* \* \*